United States Patent [19]

Sasaki

[11] Patent Number: 4,837,628

[45] Date of Patent: Jun. 6, 1989

[54] ELECTRONIC STILL CAMERA FOR RECORDING STILL PICTURE ON MEMORY CARD WITH MODE SELECTING SHUTTER RELEASE

[75] Inventor: Minoru Sasaki, Tokyo, Japan

[73] Assignee: Kabushiki Kaisha Toshiba, Kawasaki, Japan

[21] Appl. No.: 73,160

[22] Filed: Jul. 14, 1987

[30] Foreign Application Priority Data

Jul. 14, 1986 [JP] Japan .................. 61-163711

[51] Int. Cl.⁴ .......................... H04N 5/225
[52] U.S. Cl. .................. 358/209; 358/906; 358/909
[58] Field of Search ............. 358/209, 44, 906, 909, 358/335

[56] References Cited

U.S. PATENT DOCUMENTS

| | | | |
|---|---|---|---|
| 4,420,773 | 12/1983 | Toyoda et al. | 358/335 |
| 4,472,741 | 9/1984 | Takatsu et al. | 358/213 |
| 4,489,351 | 12/1984 | d'Alayer de Costemore d'Arc | 358/213 |
| 4,546,390 | 10/1985 | Konishi et al. | 358/906 |
| 4,593,312 | 6/1986 | Yamasaki et al. | 358/909 |
| 4,691,253 | 9/1987 | Silver | 358/906 |
| 4,714,966 | 12/1987 | Saito et al. | 358/335 |

FOREIGN PATENT DOCUMENTS 57-14261 1/1982 Japan .
2089169 6/1982 United Kingdom .

Primary Examiner—James J. Groody
Assistant Examiner—Robert M. Bauer
Attorney, Agent, or Firm—Oblon, Fisher, Spivak, McClelland & Maier

[57] ABSTRACT

An electronic still camera comprising a shutter release, a solid state imaging device on which an image of an object is focused through an optical system, a driver for driving the imaging device to derive an object picture signal, an analog-to-digital converter for converting this signal into a digital image signal, and a semiconductor memory card detachably loaded into the housing, for recording the digital image signal. The memory card has semiconductor memory chips mounted on a printed circuit board. The camera operates in a motion image display mode by half depression of the shutter release, and operates in a still image mode by full depression of the release. In the motion image display mode, the driver drives the imaging device on a real time basis to sequentially derive object picture signals and supplies them to an electronic view finder to display the object in the motion image mode. In the still image mode, a shutter pulse corresponding to the shutter time external set is generated. In response to this shutter pulse, the drive controls the charge storage time of the imaging device in accordance with the shutter time and drives the picture signal, which is stored during the charge storage time at a speed lower than the motion image mode, and is then recorded on the memory card.

9 Claims, 19 Drawing Sheets

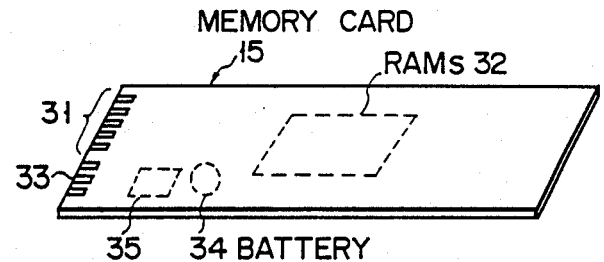
F I G. 3
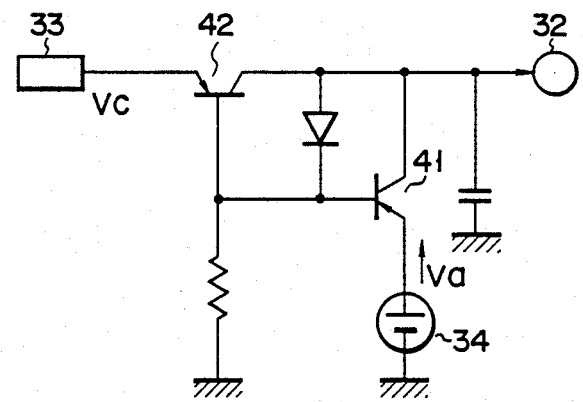
F I G. 4A
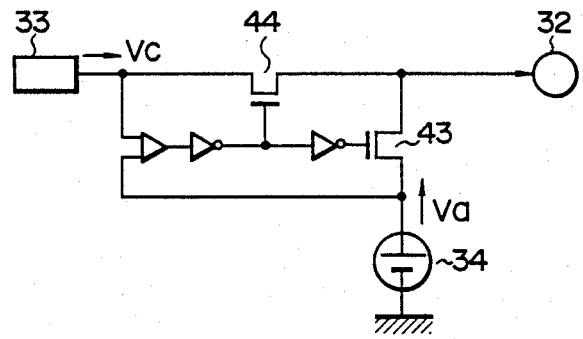
F I G. 4B

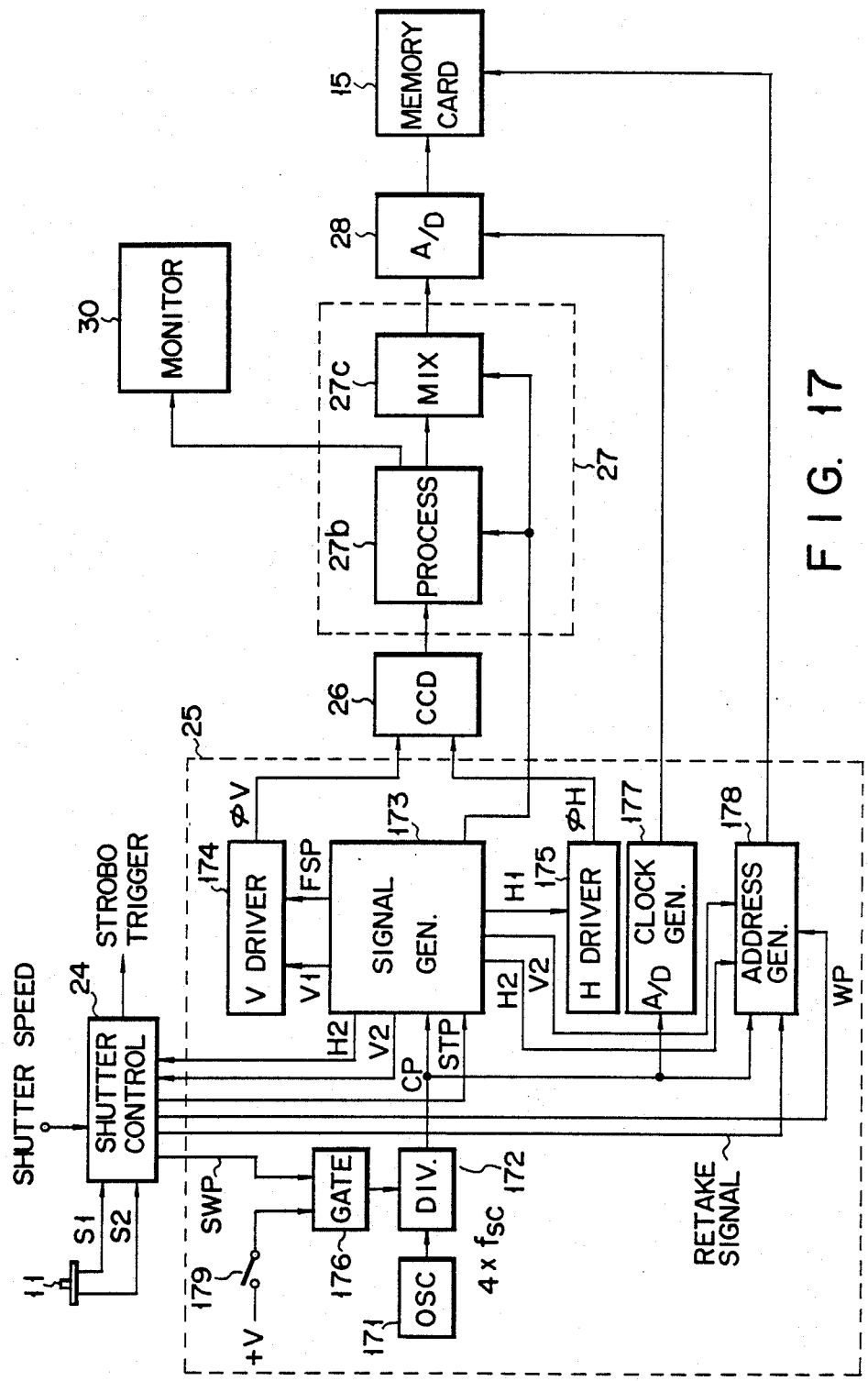
F I G. 17

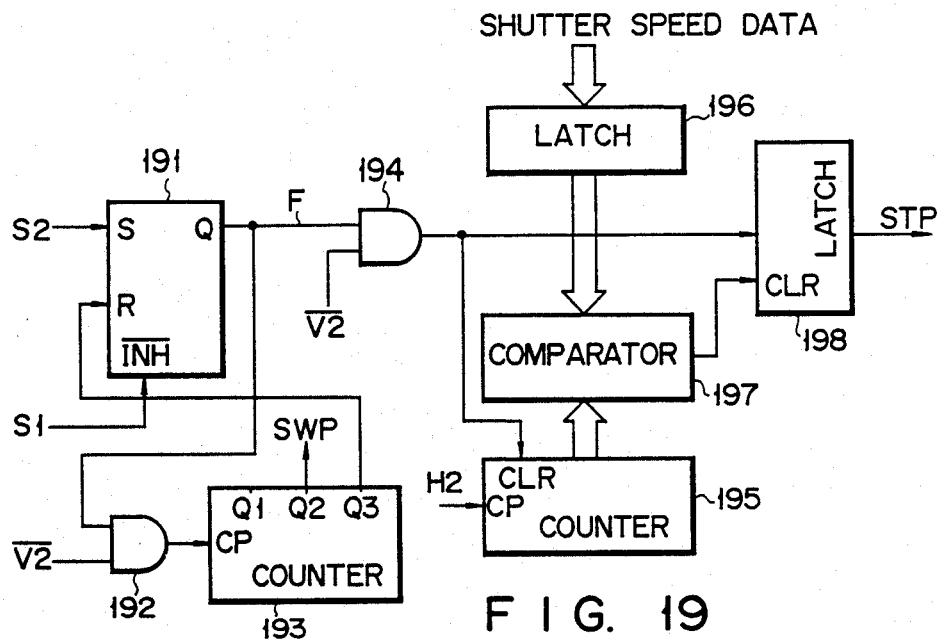
F I G. 19
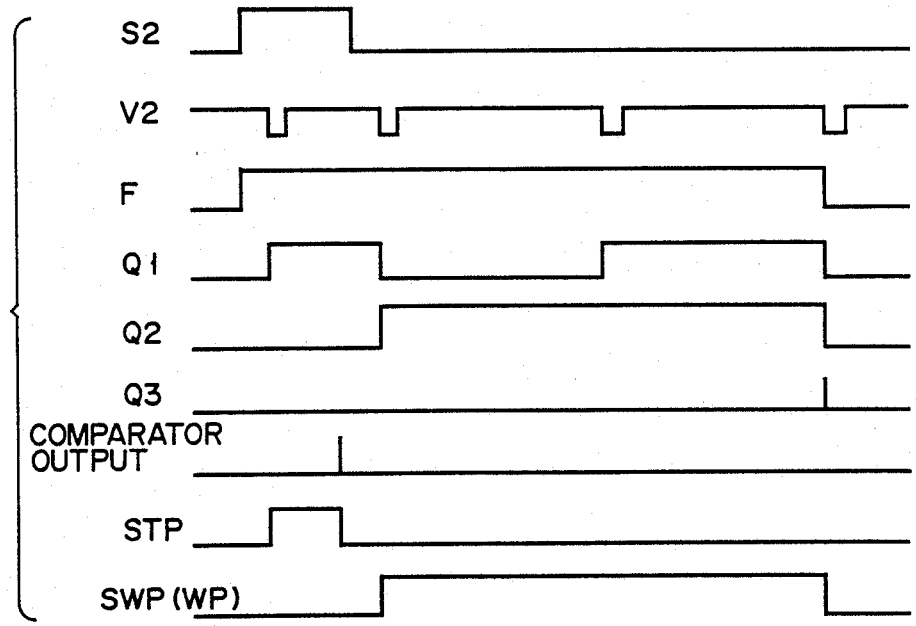
F I G. 20

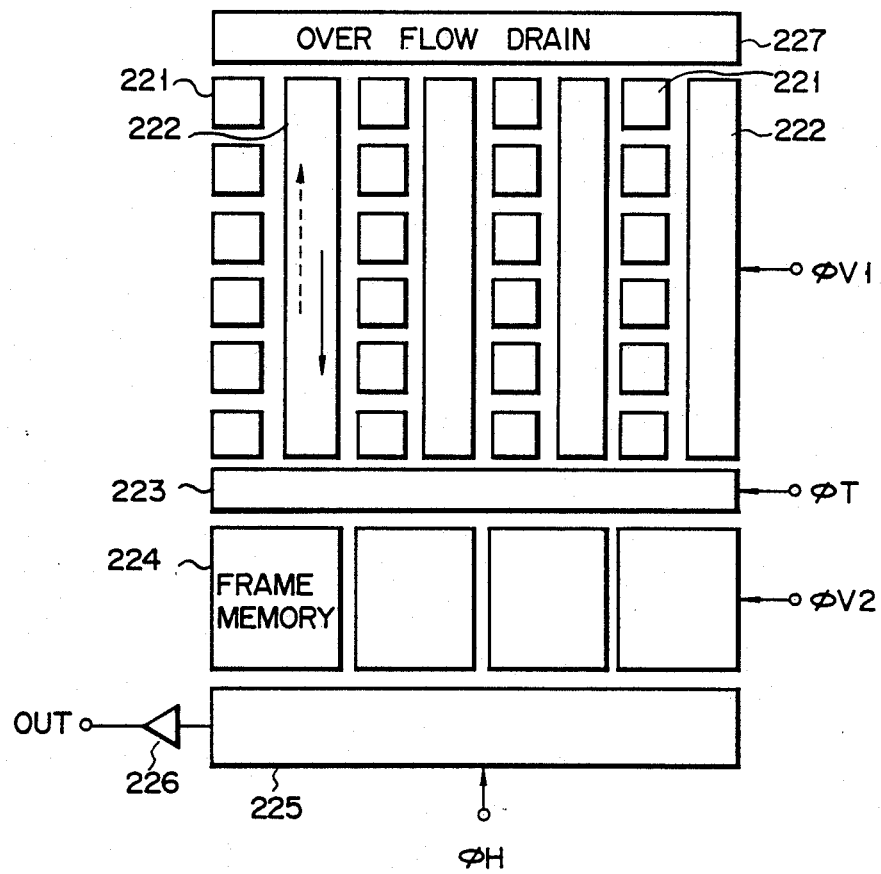
F I G. 22

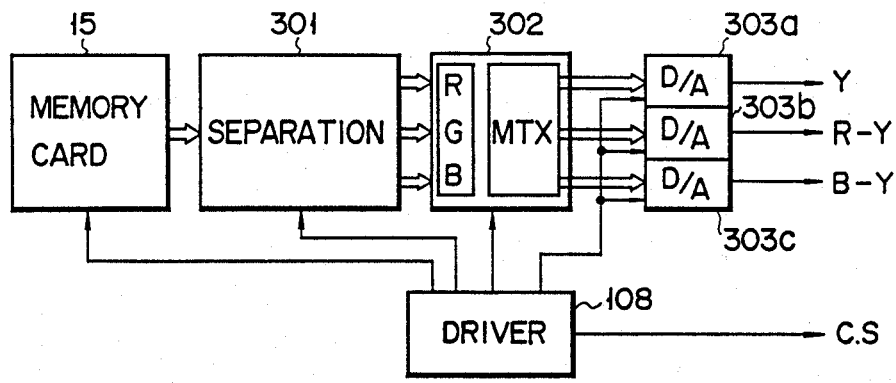
F I G. 24
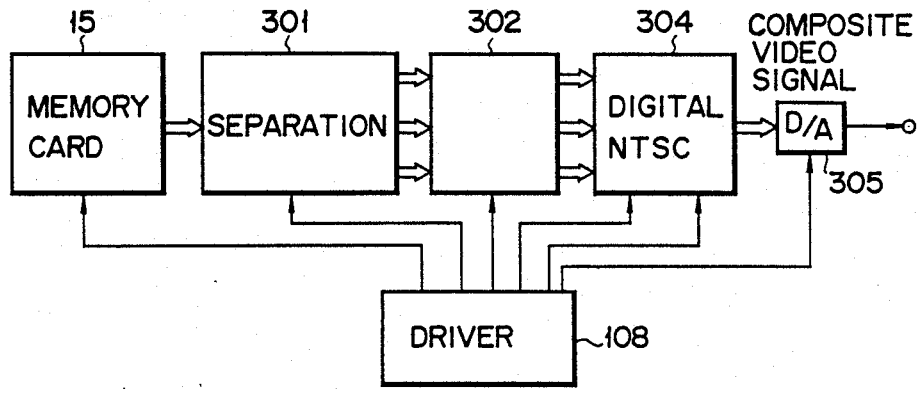
F I G. 25
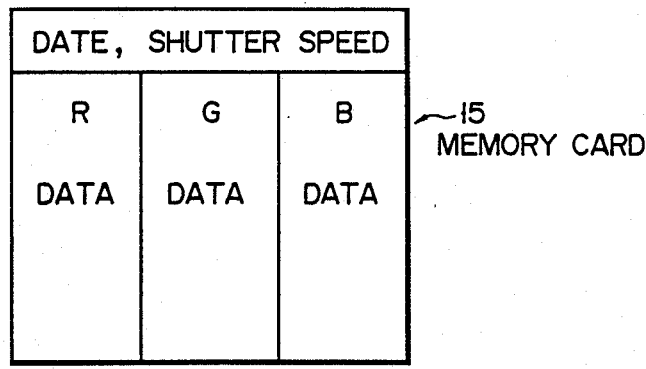
F I G. 26

ELECTRONIC STILL CAMERA FOR RECORDING STILL PICTURE ON MEMORY CARD WITH MODE SELECTING SHUTTER RELEASE

BACKGROUND OF THE INVENTION

This invention relates to an electronic still camera, and more particularly, to an electronic still camera which records a still picture on a card type recording medium.

Recently, electronic still cameras which use a solid state imaging device such as a charge coupled device (CCD) and a rotatable magnetic recording medium such as a floppy disk, have been proposed to replace a still camera using a photographic film.

According to electronic still camera of this type, an optical image of an object is imaged on a photoelectric-conversion CCD having a color separation filter array via a lens, an aperture and an optical shutter, and an image or picture signal from the CCD is separated into a luminance signal and color difference signals by a signal processing circuit. These signals are further subjected to a signal processing, such as FM modulation suitable for magnetic recording, and are then recorded onto a rotatable recording medium by a recording head.

A still picture thus recorded by an electronic still camera is reproduced by a reproducing device that is a separate unit from the camera. The reproducing device reads out a picture signal from the magnetic recording medium to a signal processing circuit where the signal is converted into a television video signal. The video signal is supplied to a TV monitor to reproduce a still picture.

This prior art electronic still camera has the following problems.

To drive the rotatable magnetic recording medium, the electronic still camera needs a drive means, such as a motor, built therein. As cameras are often used under heavy and severe environments involving hard vibration and/or very high or low temperature, it is technically difficult to stably drive the magnetic recording medium. Moreover, the provision of the motor naturally makes a small size version of the camera difficult. This would result in a lower operability of the camera. In addition, the FM recording of an image on the recording medium makes it difficult to provide a high-quality image. Dubbing of an image would significantly reduce the quality of the image.

SUMMARY OF THE INVENTION

It is an object of this invention to provide an electronic still camera which uses a card type recording medium loadable thereinto and thus is suited for a small size version of the camera.

Another object of this invention is to provide an electronic still camera, which uses a semiconductor memory card as a recording medium and can record a still picture signal on this memory card with low dissipation of electric power.

A further object of this invention is to provide an electronic still camera, which uses a solid state imaging device and can take a still picture of a high resolution by means of electronic shutter operation.

A still further object of this invention is to provide an electronic still camera, which uses a semiconductor memory as a recording medium and can take a still picture in synchronism with a flash of light emitted from a flash unit over a wide range of shutter speeds.

BRIEF DESCRIPTION OF THE DRAWINGS

FIG. 3 is a diagram for explaining a basic configuration of a semiconductor memory card used in the camera of this invention;

FIGS. 4A and 4B show arrangements of power-source switching circuit which are built in a semiconductor memory card;

FIG. 19 shows an arrangement of a shutter controller;

FIG. 20 is a diagram of a timing chart for explaining an operation of the shutter controller of FIG. 19;

FIG. 22 shows an arrangement of a CCD solid state imaging device adapted for photographing a one-frame still picture consisting of odd- and even-field images;

FIGS. 24 and 25 show modifications of a reproducing device; and

FIG. 26 is a diagram illustrating another example of a method for recording a picture data signal onto a memory card.

DETAILED DESCRIPTION OF THE PREFERRED EMBODIMENTS

An electronic still camera system according to this invention is comprised of an electronic camera unit and an electronic album unit. The former is an electronic camera using a semiconductor memory card as a recording medium, while the latter is a reproducing device having functions of reading out, from the memory card, picture information, which has been obtained by the electronic camera and recorded on the memory card, and displaying the picture on a monitor such as a TV receiver. The reproducing device can also file the picture information on an optical disk with a large memory capacity.

Referring to the accompanying drawings, an electronic still camera of this invention will be explained below, omitting the explanation of those parts having the same functions as ordinary cameras.

Figure 1:
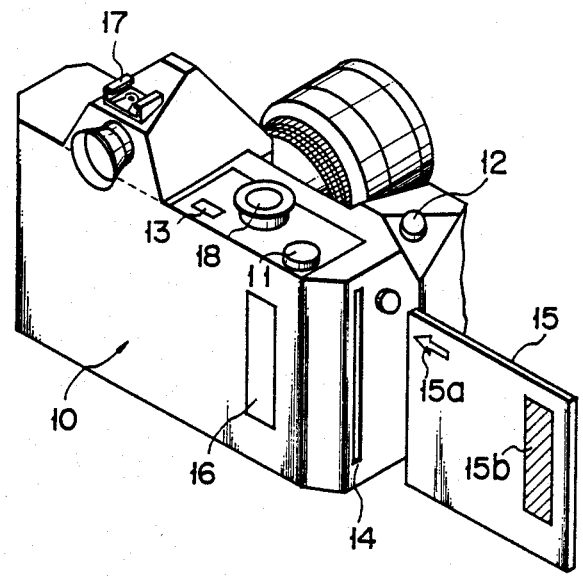
FIG. 1 is a perspective view of an electronic still camera according to an embodiment of this invention.

Referring now to FIG. 1 which is a perspective view of an electronic camera as viewed from the rear side, arranged on a housing 10 of an electronic camera (hereinafter referred to simply as "camera") are a release (shutter button) 11, a retake button 12 adapted for retaking a picture at a time of failure of photographing, and a frame counter window 13. Camera housing 10 is provided with an insert slit 14 through which a semiconductor memory card 15 adapted for use in the electronic camera of this invention can be loaded from the right-hand side as viewed from the rear of the camera. An arrow indicator 15a for indicating the direction of insertion of the card into the camera and a color indicator 15b are provided on one rear surface of memory card 15. Color indicator 15b is used to allow a user to confirm that the card has been properly loaded into the camera. On camera housing 10 a card confirmation window 16 is provided that corresponds to color indicator 15b. A hot shoe 17 for a flash (strobe) unit is provided on a finder section of the camera like ordinary cameras. Reference numeral "18" denotes a shutter speed selection dial.

Figure 2:
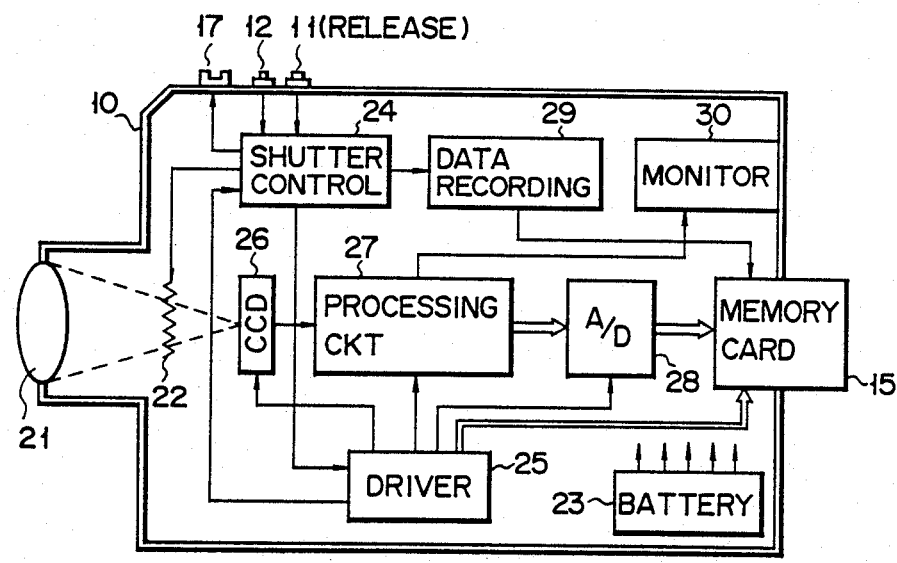
FIG. 2 is a schematic diagram of the camera shown in FIG. 1.

FIG. 2 illustrates a basic configuration of the camera according to this invention. This camera operates in a motion image mode and a still image mode. When taking a picture, focusing and the shutter speed are respectively controlled by a lens system 21 and shutter speed selection dial 18, and an aperture 22 is also adjusted, as is the case in ordinary cameras. This camera employs an electronic shutter system that controls a charge storage time in a CCD array onto which an image of an object is focused through lens system 21.

When release 11 is half depressed, a power supply voltage is supplied from power source (battery) 23 to electronic circuits, and shutter controller 24 drives driver circuit 25. As a result, the camera operates in the motion image mode. Driver 25 generates a reference clock signal, vertical and horizontal sync signals in a standard television system, vertical and horizontal transfer pulses and field shift pulses (superimposed on the vertical transfer pulses) all for driving a CCD 26, and control signals supplied to a pre-processing circuit 27 for processing image signals from CCD 26.

In the motion image mode, driver 25 supplies realtime driving pulses (1/30 sec per frame in the TV system) to CCD 26. Pre-processing circuit 27 processes output signals of CCD 26 and then supplies them to a monitor or an electronic view finder 30 such as a liquid crystal display to display a motion image of a subject. The operation of CCD 26 in the motion image mode is similar to the operation of ordinary video cameras.

When release 11 is fully depressed, the operation advances to the still image mode in which shutter controller 24 generates a shutter pulse. In response to this shutter pulse, driver 25 generates control signals to an A/D converter 28, which converts a picture data signal from pre-processing circuit 27 into a digital signal, and control signals including an address signal for semiconductor memory card 15, which stores digital picture data signals from A/D converter 28. Through this process, still picture signals obtained from CCD 26 in the still image mode are converted into digital image signals and then stored in semiconductor memory card 15.

In the still image mode, driver 25 controls a charge storage time of CCD 26 according to a set shutter speed. Data on a shutter speed is supplied to shutter controller 24 through shutter speed selection dial 18. When the shutter is fully depressed, an aperture value and a shutter speed value are read out from shutter controller 24. These photographing data may be recorded on memory card 15 through a data recording circuit 29 together with data for photographing date and time. At the time of photographing, driver 25 supplies a strobo trigger signal to hot shoe 17 to cause a flash unit to irradiate a flash of light to the subject. When recording data into memory card 15 is completed, power supply to the electronic circuits is terminated.

Another feature of this invention lies in that the speed of reading picture signals from CCD 26 varies between the motion image mode and the still image mode. To be specific, in the motion image mode, driver 25 supplies real-time drive pulses (vertical and horizontal sync signals and vertical and horizontal transfer pulses) to CCD 26 to read out picture signals from the CCD at a predetermined rate or speed determined by the standard TV system. In the still image mode, driver 25 decreases the frequency of the drive pulses to CCD 26 so that the picture signals representing a still picture are read out from the CCD at a speed lower than the motion image mode. This means that the conversion speed of A/D converter 28 and the speed of writing data onto memory card 15 may be low. Accordingly, it is possible to use a A/D converter and semiconductor memory which operate at a low speed.

In the motion image mode, CCD 26 may operate in the same manner as in ordinary video cameras. In the still image mode, however, CCD 26 operates in the following manner.

In synchronism with the vertical sync signal generated immediately after a full depression of release 11, shutter controller 24 generates a shutter pulse. In synchronism with the fall of the shutter pulse, driver 25 generates a first field shift pulse in the still image mode. The field shift pulse causes charges of the pixels of CCD 26 to be read out to corresponding vertical transfer sections, and the charges are drained away in synchronism with succeeding vertical transfer pulses whose number equals the number of stages of the vertical transfer section. The drained charges are not used. Thereafter, driver 25 supplies a second field shift pulse to CCD 26 to read out charges of the pixels to the corresponding vertical transfer sections. Then, shutter controller 24 reduces the frequency of the reference clock signal to driver 25, for example, to a half. As a result, the frequencies of the respective drive pulses generated by driver 25 are halved. Accordingly, the still picture signals are read out from CCD 26 at half the speed used in the motion image mode. At the same time, driver 25 halves the frequencies of control signals to A/D converter 28 and memory card 15, so that analog-to-digital conversion and data writing onto the memory card are performed at a lower speed. The switching of the frequencies of the drive pulses can easily be performed by switching the frequency-dividing factor of a frequency divider, which supplies an output signal of a crystal-controlled oscillator to driver 25. During camera assembly or camera adjustment, the frequency of the reference clock pulse may be changed for confirming motion pictures and for adjusting operation timings of the A/D converter and memory card.

Semiconductor memory card 15, which provides one feature of this invention, has a built-in backup battery. After memory card 15 is loaded into camera housing 10, it is supplied with a power supply voltage from battery 23 built in the camera housing. This increases the life of the backup battery built in memory card 15. The basic structure of memory card 15 will now be explained with reference to FIG. 3.

Memory card 15 can easily be fabricated using an IC-card manufacturing technique. With memory card 15 a plurality of static RAMs (Random Access Memory) 32 are disposed on a printed circuit board. At one side of memory card 15 are provided terminals 31 including data terminals, an address terminals and control terminals, and power supply terminals 33. Memory card 15, when loaded into the camera housing, receives signals and a power supply voltage through those terminals. Memory card 15 has its own battery 34 built therein. A power switching circuit 35 is provided, which switches a power source, supplying a power supply voltage to RAM chips 33, from built-in battery 34 to battery 23 of camera housing 10 when the card is loaded into the camera housing.

FIGS. 4A and 4B illustrate examples of power switching circuit 35. In the example of FIG. 4A, when memory card 15 is not loaded yet into the camera housing, a source voltage Va of internal battery 34 is coupled to RAM chip 32 through a transistor 41. When memory card 15 is loaded into the camera housing and a source voltage Vc (Va<Vc) are impressed across power supply terminals 33, voltage Vc is coupled to RAM chip 32 through a transistor 42, thus turning off transistor 41. As a result, RAM chip 32 is powered from battery 23 of the camera housing.

FIG. 4B is another example of power switching circuit 35 which uses MOS transistors. When memory card 15 is out of the camera, RAM chip 32 is powered from battery 34 through a transistor 43. When memory card 15 is loaded into the camera, the supply voltage Vc of battery 23 built in the camera is supplied to RAM chip 32 through power supply terminals 33 and a transistor 44, thus turning off transistor 43.

Figure 5:
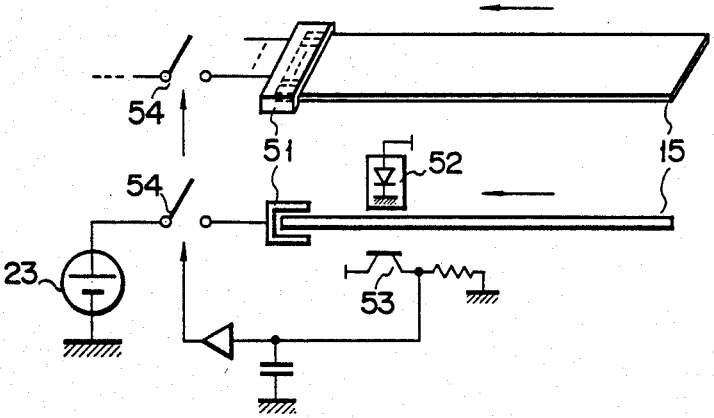
FIG. 5 is a diagram for explaining the operation of a power-source switching circuit when a semiconductor memory card is loaded into a camera.

When memory card 15 is securely loaded into the camera, battery 23 is coupled to power supply terminals 33 of the memory card. FIG. 5 shows a configuration for effecting such power switching operation. When memory card 15 is inserted in the direction of an arrow and securely loaded into a connector 51 of camera housing 10, light irradiation from a light-emitting diode 52 to a light-receiving diode 53 is interrupted. In response to this light interruption, light-receiving diode 53 turns on a switch 54 between battery 23 and connector 51. Consequently, memory card 15 is powered from battery 23. As a modification, a reflection plate may be provided on memory card 15 so that switch 54 may be controlled by detection of light reflected from this reflection plate by means of a photodetector.

Figure 6:
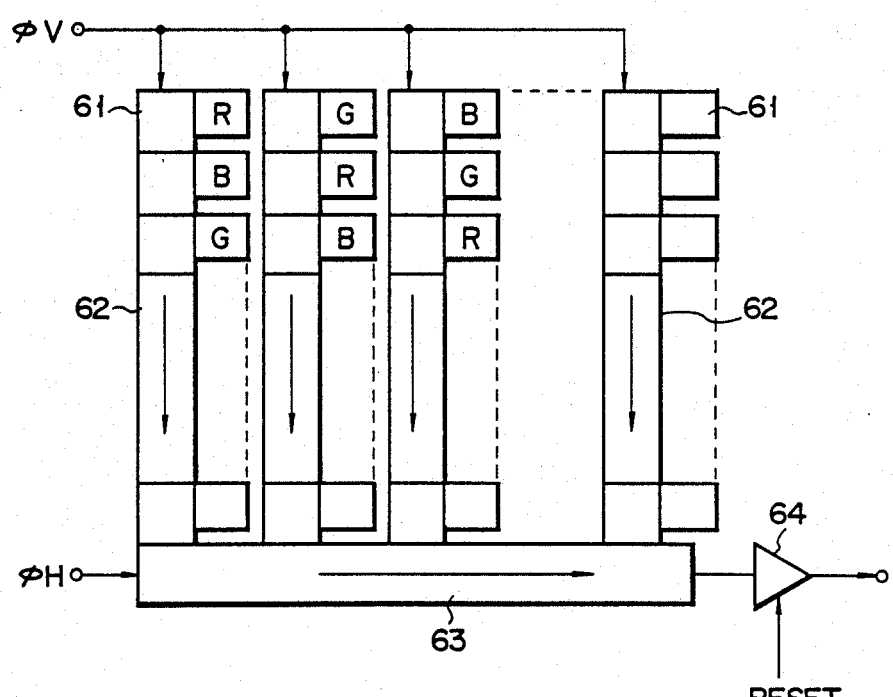
FIG. 6 shows an example of a solid state imaging device used in the electronic camera of this invention.

Referring now to FIG. 6, a single chip color imaging device using an interline transfer type CCD, will be described hereinafter.

In this color imaging device, pixels 61 formed of photoelectric conversion elements, such as photodiodes, are arranged in a two-dimensional array, and one of optical filters for separating R (red), G (green) and B (blue) light components is disposed on each pixel. Various arrangements of optical filters are well known. In the camera of this invention, the arrangement of optical filters is not limited to a particular one. For the requirement of a high quality still image photographed by a camera, the CCD array of this embodiment has 800 horizontal pixels and 500 vertical pixels, 400,000 (four hundred thousand) pixels in total. Each pixel stores a charge corresponding to the amount of incident light. A vertical transfer section 62 is provided in association with the vertically-arranged pixels of each column. The number of stages of vertical transfer sections 62 is 250, which is half the number of pixels of each column.

A horizontal transfer section 63 is provided adjacent to one end of vertical transfer sections 62, and is coupled to an output amplifier 64 for sequentially reading out pixel charges stored in the CCD array.

Vertical transfer sections 62 are supplied with vertical transfer pulses $\phi V$, while horizontal transfer section 63 is supplied with horizontal transfer pulses $\phi H$. In synchronism with a vertical sync signal, a field shift pulse FSP is superimposed on the vertical transfer pulses. In response to field shift pulse FSP, charges stored in respective pixels are shifted to corresponding vertical transfer sections 62. The charges shifted to vertical transfer sections 62 are shifted to horizontal transfer section 63 as indicated as an arrow by subsequently applied 250 vertical transfer pulses $\phi V$. The charges transferred to horizontal transfer section 63 are transferred through the horizontal transfer section by horizontal transfer pulses $\phi H$ to be read out from output amplifier 64. In practice, vertical transfer pulses $\phi V$ are of four phases, while horizontal transfer pulses $\phi H$ are of two phases. This type of CCD array driving is not unique to the electronic camera of this invention, but is a well-known technique in the field of video cameras.

As shown in FIG. 2, the output electric signal of the CCD array is supplied through pre-processing circuit 27 to monitor 30 provided on the camera housing to display a motion image, and is also supplied to A/D converter 28 where the signal is converted into a digital signal to be recorded on the memory card in the still image mode. This signal processing is illustrated in FIG. 7 in more detail than in FIG. 2.

Figure 7:
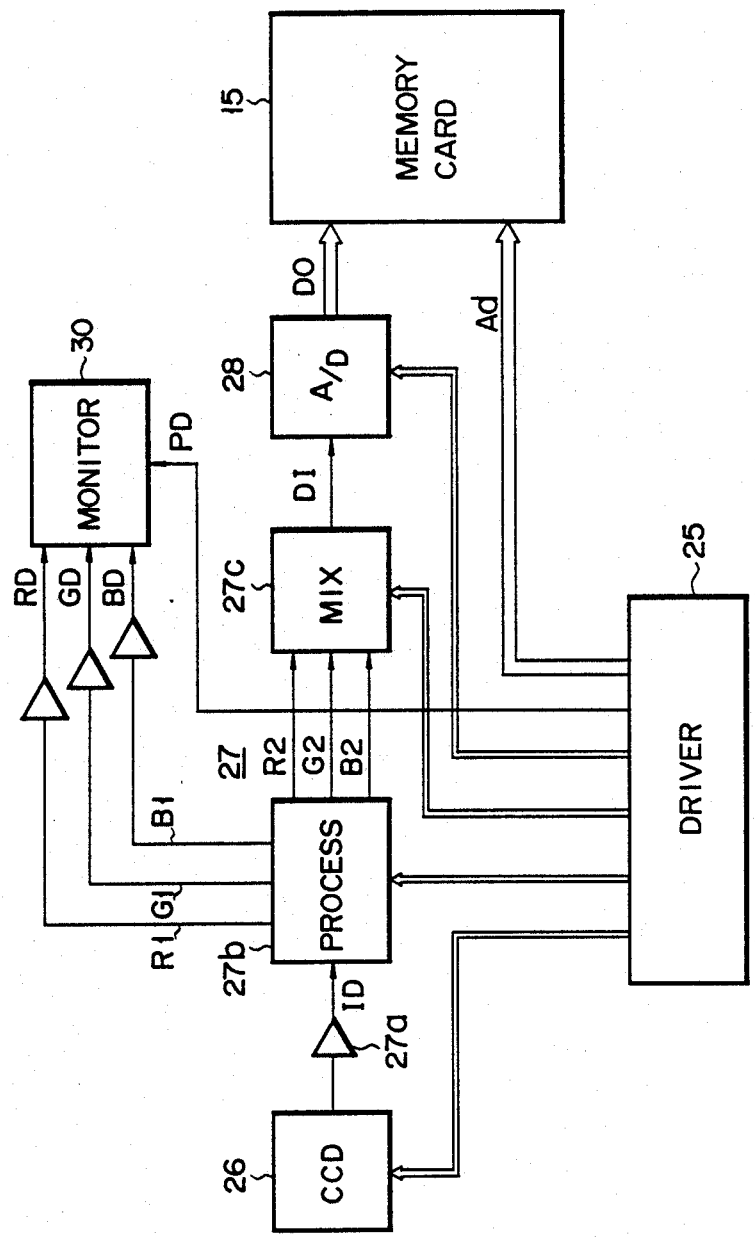
FIG. 7 shows an arrangement of a signal processing circuit of FIG. 2.

In FIG. 7, when drive pulses (including the vertical and horizontal transfer pulses, field shift pulse and a reset pulse to reset output amplifier 64) are supplied to CCD array 26 from driver 25, the output signal of CCD array 26 is extracted through output amplifier 64 and is applied to a processing circuit 27b through a preamplifier 27a. Processing circuit 27b is provided with an ability to separate a serial signal ID, which includes R, G and B color component signals extracted from CCD array 26, into R, G and B signals, and subject these signals to a white balance compensation and gamma compensation. Signals RD, GD and BD that have been subjected to the white balance compensation are transferred to liquid crystal monitor 30 for motion image display. Monitor 30 is supplied with vertical sync signal V and horizontal sync signal H from driver 25. While monitoring a motion image of a subject on the liquid crystal monitor, the aperture and the view angle for photographing a still picture may be determined.

The above is the explanation of monitoring a motion image. As will be described later, when release 11 is fully depressed, the referency frequency of the clock applied to driver 25 is reduced, thus reducing the frequency of output signals of driver 25. As a result, still picture signal is output from CCD array 26. Like in the motion image mode, signals R2, G2, B2 are extracted from processing circuit 27b. These output signals are applied to a mixer 27c where they are transformed into a serial signal DI. This serial signal DI is applied to A/D converter 28 to be converted into a digital signal of, for example, 8 bits, and is applied to data terminals of memory card 15. At the same time, driver 25 supplies, to address terminals of the memory card, address data of the RAM chips where the digital signal is to be stored.

Figure 8:
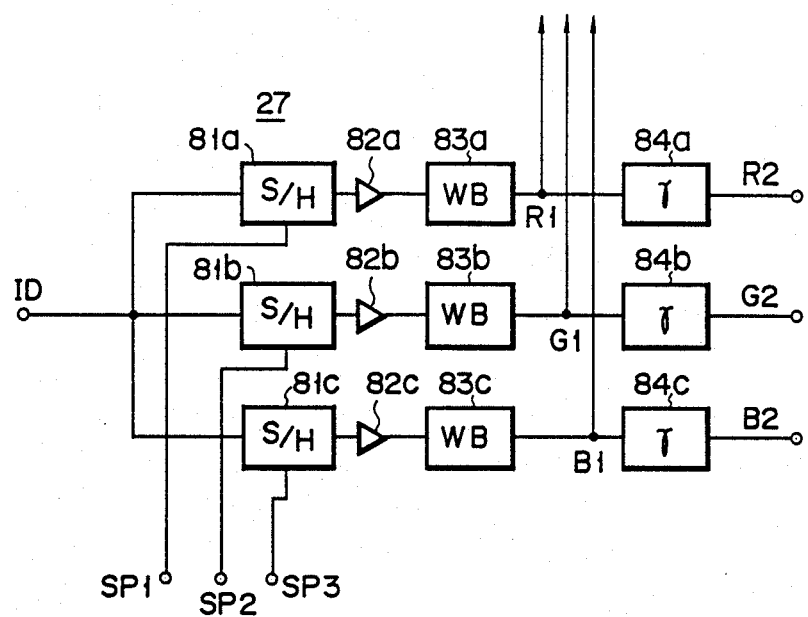
FIG. 8 shows an arrangement of the signal processing circuit of FIG. 7.
Figure 9:
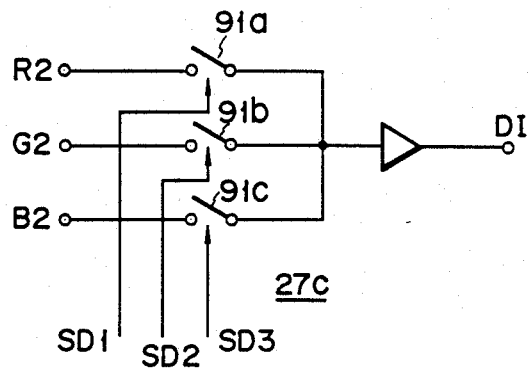
FIG. 9 shows an arrangement of a mixer of FIG. 7.
Figure 10:
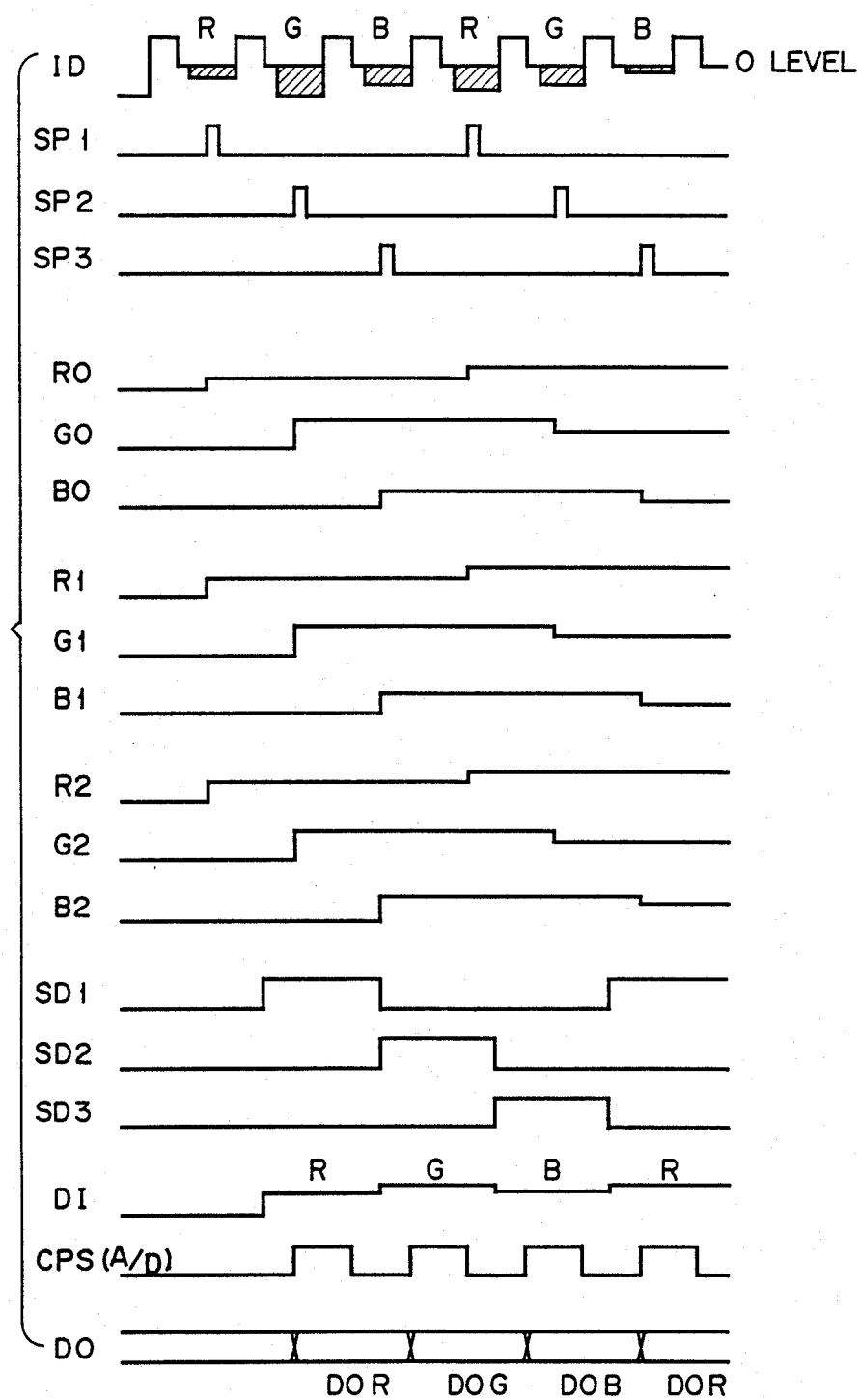
FIG. 10 shows a timing chart for explaining the operation of the signal processing circuit of FIG. 7.

FIGS. 8 and 9 illustrate configurations of processing circuit 27b and mixer 27c, respectively. FIG. 10 shows a timing chart of the operation of processing circuit 27b, mixer 27c and A/D converter 28.

In FIG. 8, input signal ID is supplied to sample/hold circuits 81a, 81b and 81c, and is sampled and held by sequential sample pulses SP1, SP2 and SP3 (see FIG. 10) provided from driver 25. As indicated by the hatched sections in FIG. 10, the input signal ID includes sequential R, G and B signals of a negative polarity. The output signals of sample/hold circuits 81a–81c are amplified by inverting amplifiers 82a–82c, providing positive polarity R0, G0 and B0 signals. These R0, G0, B0 signals are respectively supplied to white balance circuits 83a–83c for amplitude compensation in consideration of illumination light used at the time of photographing, providing white-balance compensated signals R1, G1 and B1 shown in FIG. 10. These color signals are applied to a known liquid crystal display. When a CRT display is used for reproduction of a still picture, signals R1, G1 and B1 are respectively supplied to gamma compensation circuits 84a–84c to provide gamma-compensated signals R2, G2 and B2. When monitor 30 is a CRT display, the monitor should be supplied with signals R2, G2 and B2.

Signals R2, G2 and B2 are supplied to mixer 27c shown in FIG. 9. This mixer is constituted by analog switches 91a–91c, which are switched by sequential switching pulses SD1–SD3 (see FIG. 10) to produce an output signal DI. This signal DI includes sequential R, G and B signal components as shown in FIG. 10. Driver 25 supplies an A/D sample clock CPS to A/D converter 28 to provide a digital output signal Do, which contains digital data DoR, DoG and Dob of R, G and B components, as shown in FIG. 10.

Figure 11A:
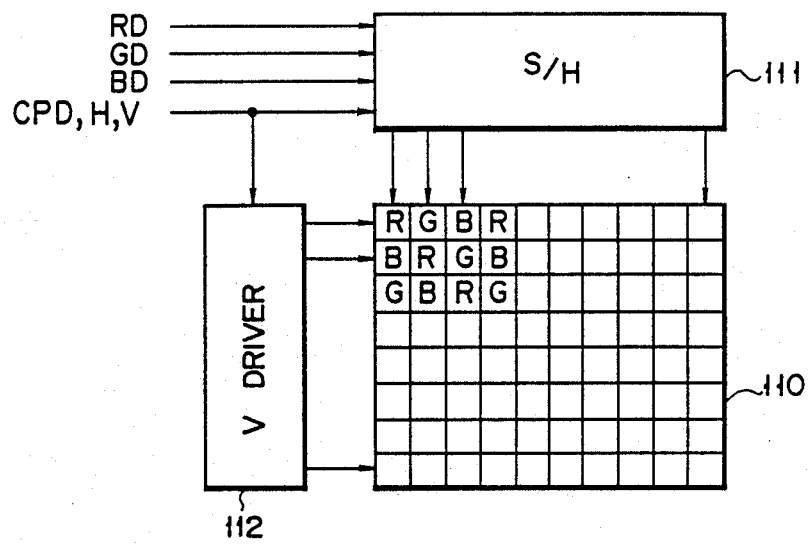
FIG. 11A shows an arrangement of a view finder built in a camera.
Figure 11B:
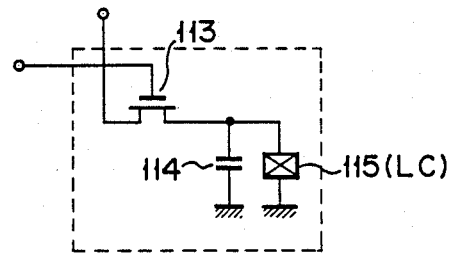
FIG. 11B shows an arrangement of one pixel element of FIG. 11A.

Liquid crystal monitor 30 may be a known liquid crystal display, whose structure will now be explained with reference to FIGS. 11A and 11B. This liquid crystal display has an active-matrix type liquid crystal display 110, which has the individual pixels arranged in a matrix form. A sample/hold circuit 111 and a vertical driver 112 are provided to drive the individual pixels of the liquid crystal display. Sample/hold circuit 111 is applied with output signals RD, GD and BD of processing circuit 27b, and sample clocks CPD and horizontal sync signal H from driver 25. Vertical driver 112 is supplied with the horizontal sync signal H and the vertical sync signal V from driver 25. FIG. 11B illustrates a configuration of each pixel of the liquid crystal display. One of signals RD, GD and BD from sample/hold circuit 111 is supplied to the drain of a MOS transistor 113 and a timing pulse from vertical driver 112 is supplied to the gate of transistor 113. When transistor 113 is turned on by the timing pulse, the corresponding color signal is written in capacitance 114 of liquid crystal 115, which is coupled to the source of the transistor and corresponds to a pixel.

Figure 12:
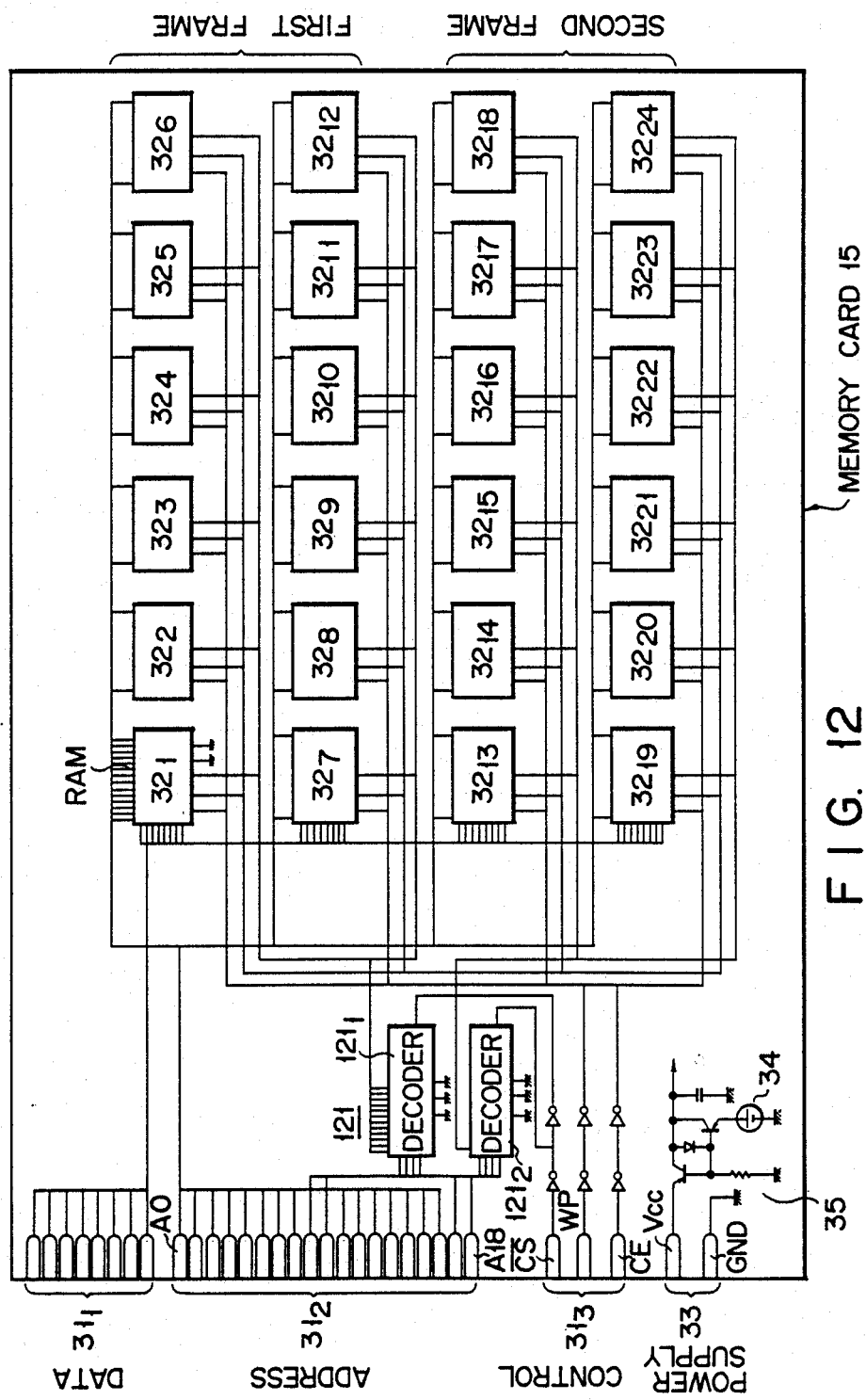
FIG. 12 shows an embodiment of a semiconductor memory card used in the electronic camera of this invention.

FIG. 12 shows the configuration of semiconductor memory card 15 which is one feature of this invention. This memory card can be easily fabricated using a known technique of manufacturing a card type electronic device known as an integrated circuit (IC) card. In the illustrated example, 24 static RAM chips $32_1$-$32_{24}$ each of 256 Kbits are arranged on a printed circuit board with a thickness of 2-3 mm. Toshiba TC55257 type chip may be used for the RAM chips. These 24 RAM chips are used for photographing a two-frame still picture. RAM chips $32_1$-$32_{12}$ are used to record picture data of a first still picture, and RAM chip $32_{13}$-$32_{24}$ are used to record picture data of a second still picture. Further, RAM chips $32_1$-$32_6$ and $32_{13}$-$32_{18}$ are for recording picture data of an odd-numbered field, and RAM chips $32_7$-$32_{12}$ and $32_{19}$-$32_{24}$ are for recording picture data of an evennumbered field.

The reason why 12 RAM chips of 256 Kbits are needed to record a one-frame still picture is as follows. Assuming the CCD array has 768 (horizontal)×491 (vertical) effective pixels and 8 bits are assigned to a signal per pixel, a picture signal for representing a one-frame still picture needs 3.017 Mbits. This obviously requires 12 RAM chips of 256 Kbits to store such amount of data. For instance, the use of a large-capacity RAM chip of 4 Mbits enables to record a greater number of still pictures.

8-bit data terminals $31_1$, address terminals $31_2$ for receiving address data A0-A18, control terminals $32_3$ and power supply terminals 33 are formed on side end of memory card 15. Between power supply terminals 33 and built-in battery 34 of the memory card is provided power switching circuit 35 as shown in FIG. 4A. Data terminals $31_1$ are coupled in common to data terminals of RAM chips $32_1$-$32_{24}$. Address terminals $31_2$ which are associated with address data A0-A7, A10-A16 are coupled in common to address terminals of RAM chips $32_1$-$32_{24}$.

Address terminals $32_2$ which are associated with address data A8, A9, A17, A18 are coupled to address decoders $121_1$ and $121_2$ used for chip selection. Toshiba 74HC154 type decoder may be used for these address decoders. Address decoder $121_1$ selects one of 12 RAM chips $32_1$-$32_{12}$ in response to address data A8, A9, A17, A18 while address decoder $121_2$ selects one of RAM chips $32_{13}$-$32_{24}$. The logic level of a chip select signal $\overline{CS}$ supplied from driver 25 determines which one of address decoders $121_1$ and $121_2$ should be enabled. Driver 25 supplies a write signal WP and a card enable signal CE to each RAM chip. That is, when the memory card is loaded into the camera, the RAM chips are enabled by card enable signal CE and become ready for data writing by write signal WP that is generated in the still mode.

Figure 13:
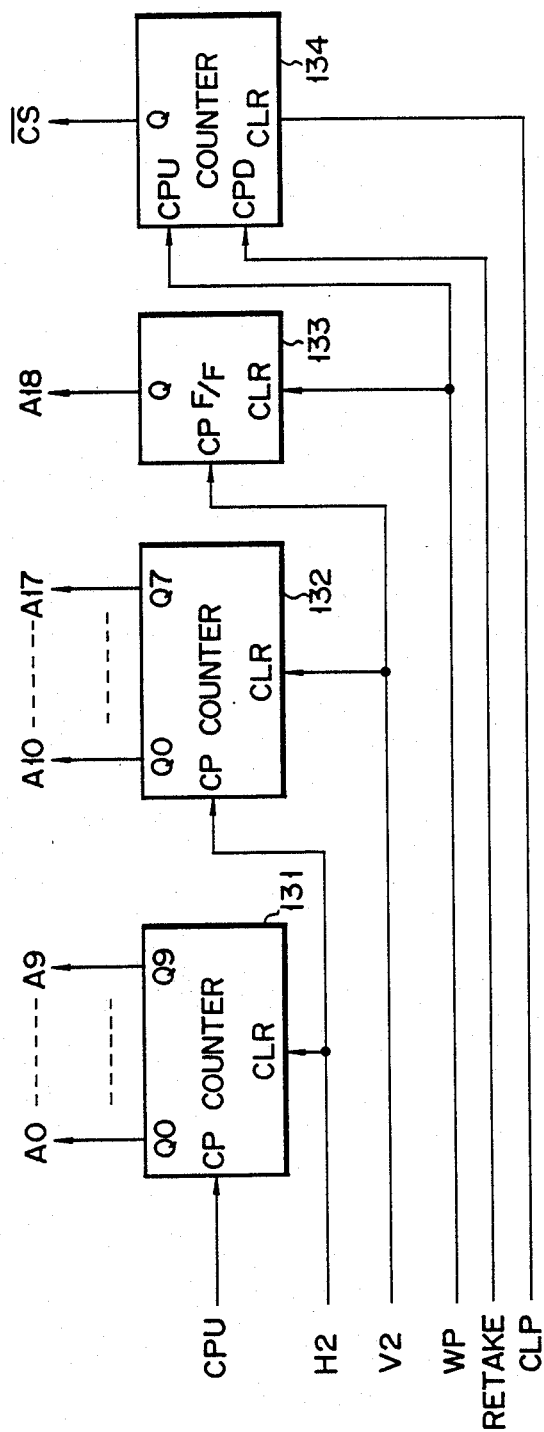
FIG. 13 shows an arrangement of an address generator provided in a driver circuit of FIG. 2.

FIG. 13 illustrates the configuration of an address generator provided in driver 25. The address generator has first and second counters 131 and 132, a flip-flop 133 and an up/down counter 134. The first counter 131 is cleared by a sync signal H2, having the same frequency as horizontal sync signal H1, so as to count clock CPU applied to its clock terminal and having the same frequency as the CCD driving pulse, thereby generating address data A0–A9 for the horizontal direction. The second counter 132 is cleared by a sync signal V2, having the same frequency as vertical sync signal V1, and counts sync signal H2, thus providing address data A10–A17 for the vertical direction.

Flip-flop 133 is cleared by write pulse WP and is clocked by vertical sync signal V2. Flip-flop 133 outputs address data A18 from its output Q. Address data A18 discriminates the first and second fields and is used to select the first half or second half of 12 RAM chips. Up/down counter 134 is cleared by a clear pulse CLP generated when the memory card is loaded into the camera, is up-counted by write pulse WP produced in the still image mode and is down-counted by a retake pulse produced by the operation of retake button 12. When memory card 15 is adapted for photographing two still pictures as shown in FIG. 12, counter 134 may be a binary counter. Counter 134 produces the aforementioned chip select (picture select) signal CS. When the retake button is operated, counter 134 is down-counted so that a desired still picture can be retaken or rerecorded on the memory card.

Figure 14:
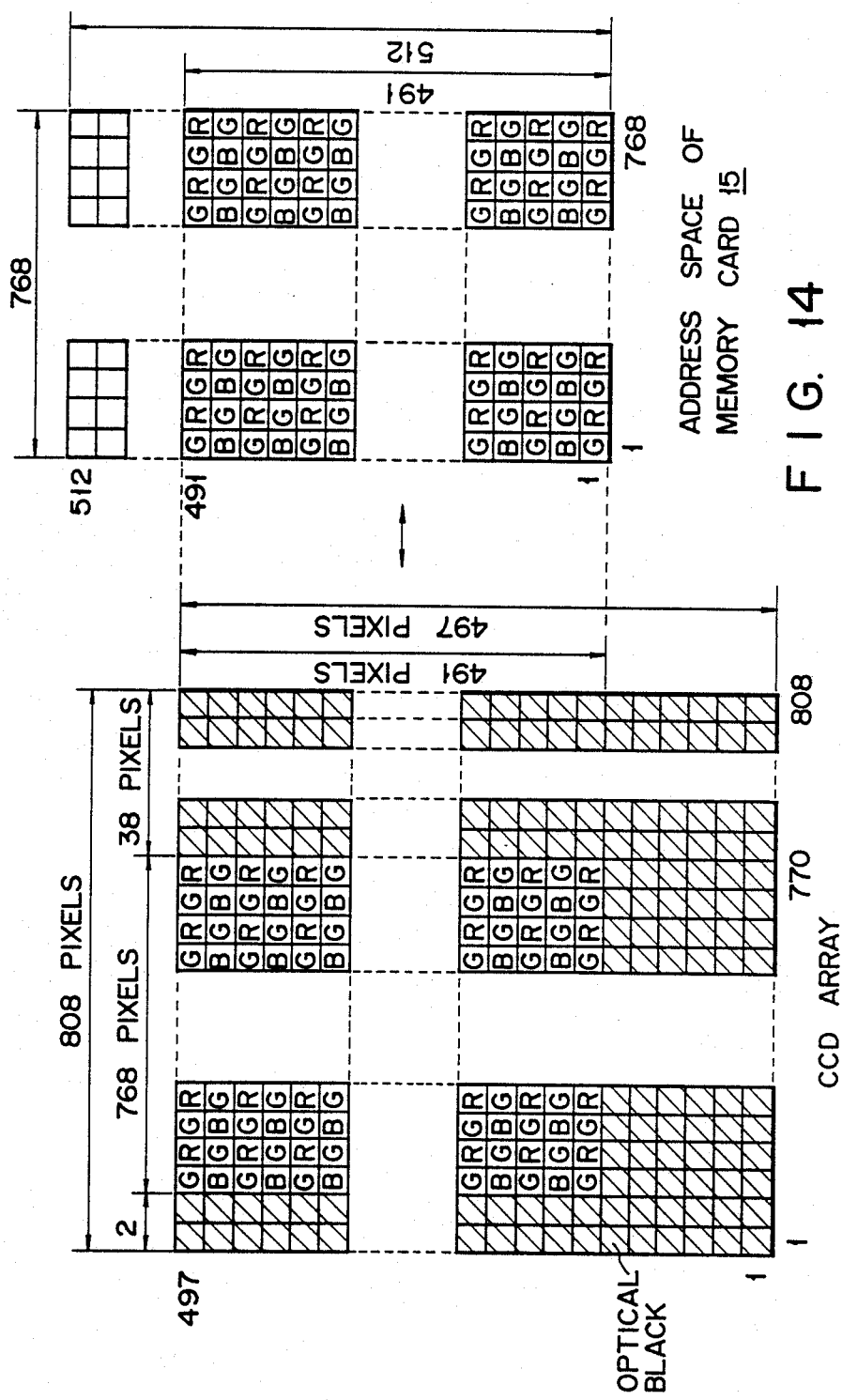
FIG. 14 is a diagram illustrating the relationship between pixels of a CCD array and an address space of a semiconductor memory card.

FIG. 14 shows the relationship between the pixel arrangement of the CCD array and the address space on the memory card. The CCD array according to this embodiment consists of 808(H)×497(V) pixels, with 768(H)×491(V) of the total pixels being used as an effective pixel region. The remaining, hatched pixel region constitutes an optical black region. Pixel data is recorded on the memory card according to the arrangement of the pixels in the effective pixel region. The recording region of the memory card is set to 768(H)×512(V) in order to set the bits of one-frame picture data at an integer-multiple of 256 Kbits for effective use of the memory and also to simplify the configuration of the address generator. The aforementioned address data A0–A9 produced by the address generator select one of 768 columns of the memory card. Address data A10–A18 select one of 512 rows of the memory card. Address data A0–A18 is adapted for addressing memory locations to store one-frame still image. Photographing data, such as the date and the shutter speed supplied from data recording circuit 29 can be recorded in that region of the memory card where no picture data is recorded. For this purpose, the output of data recording circuit 29 and the output of A/D converter 28 are coupled to the memory card through a selector, which is controlled by address data. In other words, when the address data designates the image-recording region of the memory card, the selector couples the output of A/D converter 28 to memory card 15.

After a given number of still pictures are recorded or to reproduce the recorded still pictures, memory card 15 is unloaded from camera 10. The picture data stored in the RAM chips can be retained by built-in battery 34 of the card. An exclusive reproducing device (electronic album) is used to reproduce the still pictures recorded on memory card 15.

Figure 15:
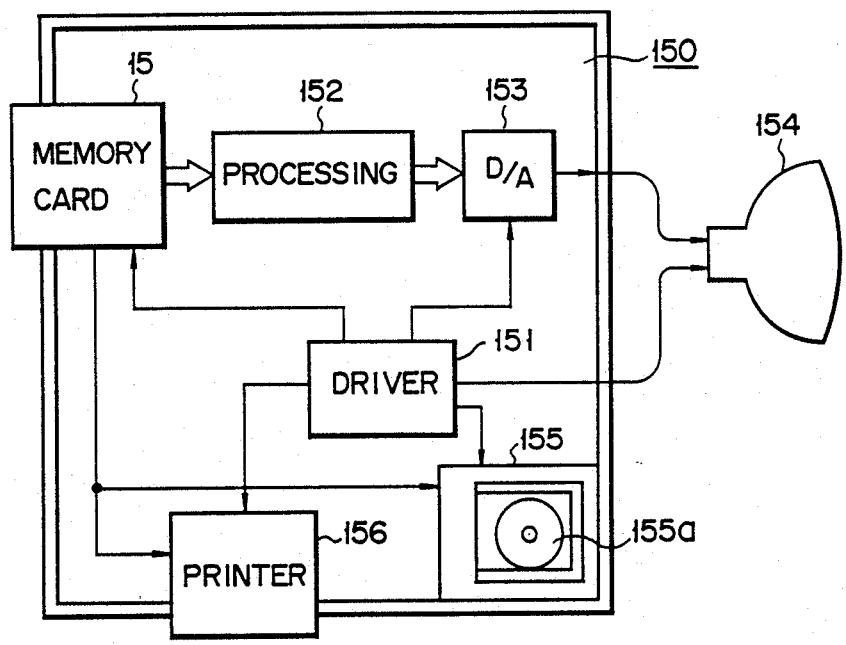
FIG. 15 shows an arrangement of an electronic album for reproducing still pictures recorded on a semiconductor memory card.

FIG. 15 schematically illustrates a configuration of the electronic album.

When memory card 15 is loaded into a reproducing device 150 having a memory card receiving mechanism like the camera, the memory card is powered by a power source (not shown) in the reproducing device, as is the case when the card is loaded into the camera. A driver 151 supplies a readout signal and an address signal to memory card 15 so that a picture data signal is read out from memory card 15 pixel by pixel. The read picture data signal is properly processed in a signal processing circuit 152 and is converted into an analog signal. Analog R, G and B signals are supplied together with sync signals from driver 151 to a CRT monitor 154 provided with R, G and B input terminals to display the photographed still pictures on the CRT screen. Reproducing device 150 can be provided with an optical disk unit 155, which records data from memory card 15 onto an optical disk 155a in response to optical disk control signals from driver 151. A printer 156 may be provided, as needed, to provide a hard copy of the still picture.

Figure 16:
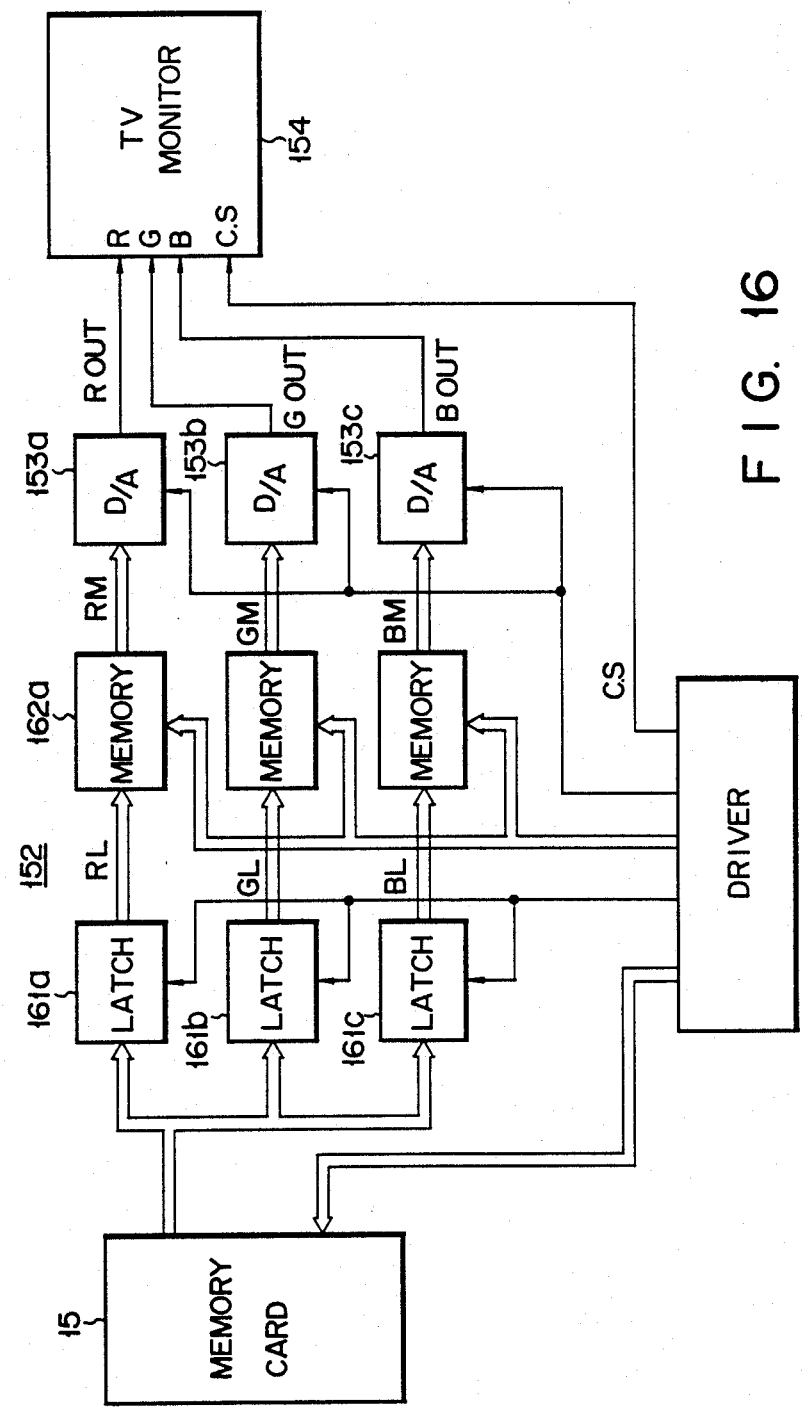
FIG. 16 shows an arrangement of a signal processing circuit of FIG. 15.

FIG. 16 particularly shows signal processing circuit 152 of FIG. 15 in detail. Picture data signals are output from memory card 15 in the order of R, G and B. The R, G and B signals are sequentially latched by latch circuits 161a, 161b and 161c by sequential latch control signals produced by driver 151. As a result, R, G and B signals are separated from one another and are stored in separate memories 162a, 162b and 162c. When all the R, G and B signals are stored in the corresponding memories, memories 162a–162c are set to a readout mode by driver 151. The R, G and B signals read out from memories 162a–162c in response to the readout clock are respectively supplied to D/A converters 153a–153c, which produces analog R, G and B signals to be supplied to CRT monitor 154.

Figure 17:
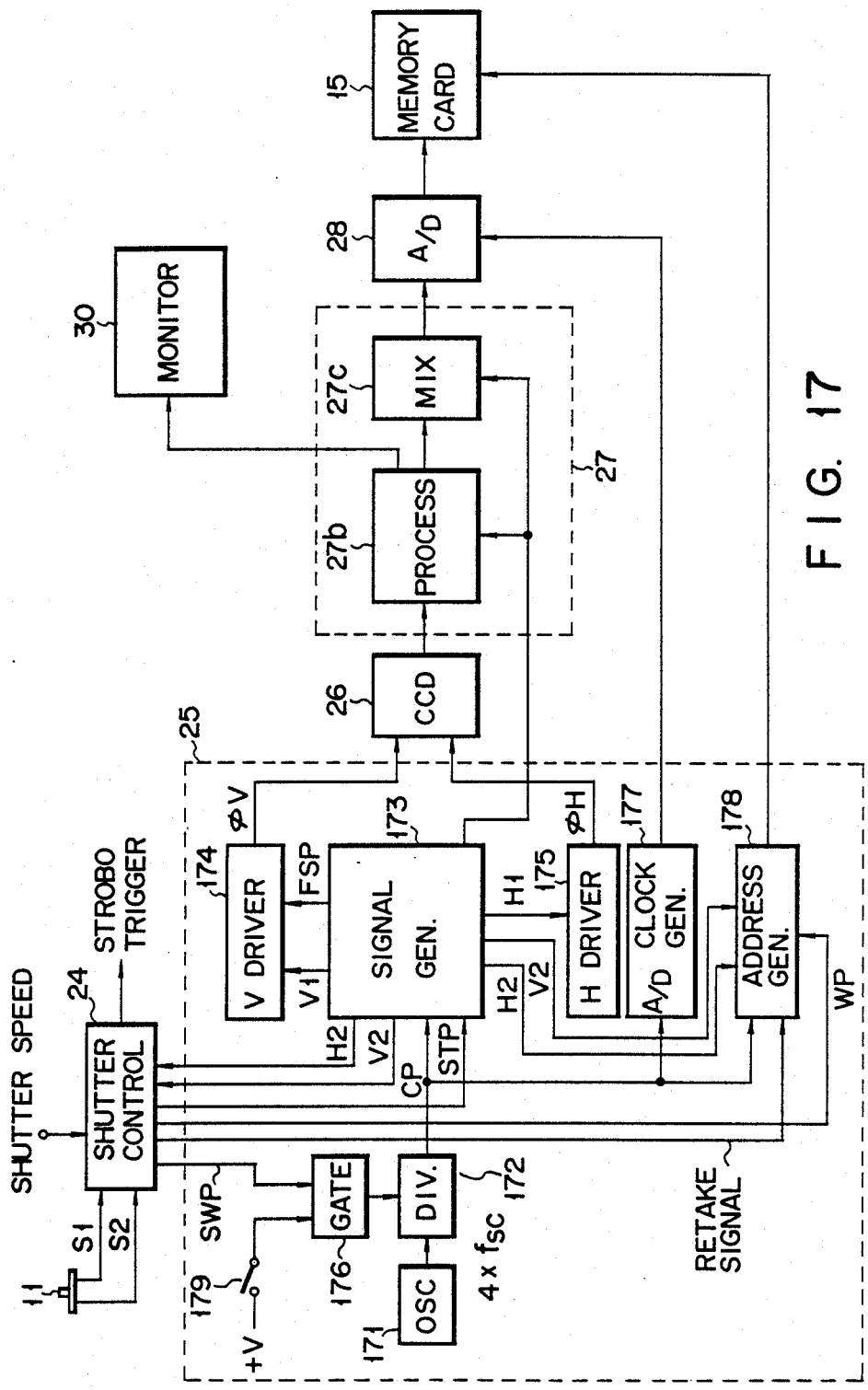
FIG. 17 shows an arrangement of a driver circuit in particular.
Figure 18:
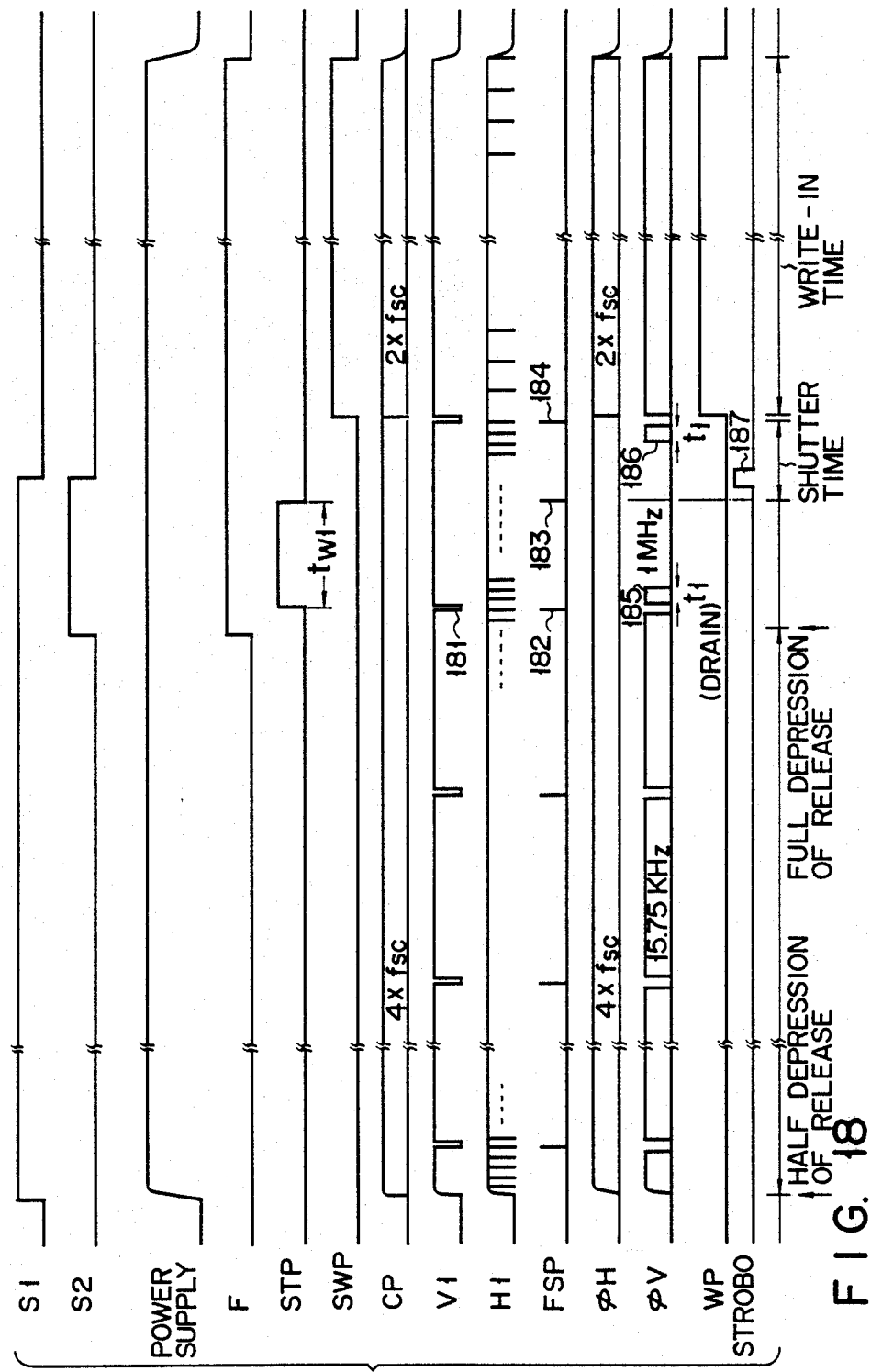
FIG. 18 is a diagram of a timing chart for explaining an operation of the electronic camera of this invention.

The photographing system of the electronic camera of this invention will now be described with reference to FIGS. 17 and 18. FIG. 17 particularly shows driver circuit 25 in detail and FIG. 18 shows a timing chart for explaining the operation of the photographing system.

When release 11 is half depressed to pick up a still picture, a power source voltage is supplied to the individual circuits. A crystal-controlled oscillator 171 generates a clock pulse of 4×fsc (about 14.3 MHz: fsc is a color subcarrier frequency of 3.58 MHz). This 4×fsc frequency is needed to drive CCD array 26 of 800×500 pixels on a real time basis (1/60 sec per frame defined in the standard TV system) to display a motion image. A frequency divider 172 coupled to oscillator 171 supplies an output clock pulse CP to a signal generator 173. The frequency divider is set to have a frequency-dividing factor of one in the motion image mode. Signal generator 173 generates vertical sync signal V1 (60 Hz), horizontal sync signal H1 (15.75 KHz), field shift pulse FSP, and a clock of 1 MHz for draining charges away from the CCD array, in synchronism with clock pulse CP. Field shift pulse FSP is generated in synchronism with the vertical sync signal. Signal generator 173 also generates sync signals V2, H2 and the like, which are out of phase with signals V1 and H1.

The frequency-dividing factor N of frequency divider 172 is set at one in the motion image mode, so that CCD 26 is driven on a real time basis to output motion picture data as in usual video cameras. As will be described later, the frequency-dividing factor is set to two in the still image mode, which halves the frequencies of clock pulse CP and various sync signals produced in signal generator 173. Consequently, the speed for reading out picture data from CCD array 26 is halved, thus making it possible to perform A/D conversion and data writing on the memory card at a low speed.

Signal generator 173 supplies vertical sync signal V1, horizontal sync signal H1 and field shift pulse FSP to vertical driver 174 to produce vertical transfer pulse φV of four phases. Vertical transfer pulse φV has 250 pulses of 15.75 KHz in one cycle of vertical sync signal V1 in correspondence with the 250 stages of the vertical transfer section. Field shift pulse FSP is superimposed on the first-phase vertical transfer pulse φV in synchronism with the vertical sync pulse.

Signal generator 173 supplies clock pulse CP and horizontal sync signal H1 to a horizontal driver 175 to produce horizontal transfer pulses φH of two phases. Horizontal transfer pulse φH is produced by gating clock signal CP of 4×fsc with horizontal sync signal H1. That is, horizontal transfer pulse φH has the same frequency as clock signal CP.

When release 11 is half depressed, as mentioned above, CCD array 26 is driven by vertical transfer pulse φV and horizontal transfer pulse φH generated from vertical driver 174 and horizontal driver 175, thus providing a motion picture data signal of a field frequency of 60 Hz. This motion picture data signal is processed, as mentioned above, by processing circuit 27b which is controlled by the control signal generated from signal generator 173, thus providing R, G and B signals. These R, G and B signals are supplied to monitor (view finder) 30 of the camera to display a motion picture of an object.

While observing the monitor for view angle setting and/or focusing adjustment, when a user (camera man) fully depresses release 11, shutter controller 24 responds to this action and produces shutter pulse STP. Shutter controller 24 is supplied with vertical sync signal V2 and horizontal sync signal H2 from signal generator 173. As shown in FIG. 18, shutter pulse STP is produced in synchronism with the first vertical sync signal 181 immediately after full depression of release 11. At the same time, field shift pulse 182 is produced. The pulse width tw1 of shutter pulse STP defines the electronic shutter time of CCD array 26, and is set to an integer-multiple of the pulse interval (63.5 μsec) of the horizontal sync signal. Shutter pulse STP is supplied to signal generator 173 which generates field shift pulse 183 in response to the fall of shutter pulse STP.

Field shift pulse 184 is generated in synchronism with the first vertical sync signal immediately after the fall of shutter pulse STP. The time interval between field shift pulses 183 and 184 is the electronic shutter time of the CCD array. The charges stored in CCD array 26 within this time are read out as still picture data. Since the time interval between field shift pulses 182 and 184 is equal to one cycle period (16.67 msec) of the vertical sync signal, the shutter time is indicated by 16.67 - tw1 msec. For instance, since tw1 is set to an integer-multiple of one cycle period of the horizontal sync signal, with tw1=230×63.5 μsec, the shutter time is about 2 msec or shutter speed is about 1/500 sec. The pulse width tw1 of shutter pulse STP is determined by shutter controller 24 based on the setting of the shutter speed dial.

Shutter controller 24 generates a frequency-division-factor switching pulse SWP and a write pulse WP in synchronism with the first vertical sync signal or field shift pulse 184 immediately after full depression of release 11. Frequency-division factor switching pulse SWP is supplied to a frequency divider 172 through a gate 176. Consequently, the frequency-dividing factor of frequency divider 172 is switched to two. This switches the frequency of clock CP applied to signal generator 173 from 4×fsc to 2×fsc. As a result, the frequency of each sync signal generated by signal generator 173 is halved.

The still picture data is read out from CCD array 26 at a low speed and is applied to A/D converter 28 after the aforementioned signal processing in preprocessing circuit 27. An A/D clock generator 177 is provided to gate clock CP with write pulse WP so that the A/D-conversion clock CPS is applied to A/D converter 28. Address generator 178 is arranged as shown in FIG. 13. Since the frequencies of clock CP, vertical sync signal V and horizontal sync signal H are halved, still picture data is written into the memory card at a low speed. The writing time or the duration of frequency-division factor switching pulse SWP and write pulse WP is set to four times the cycle period of the vertical sync signal in the normal state or motion picture mode.

Charge draining in CCD array 26 will now be explained. As shown in FIG. 18, field shift pulse 182 is produced in synchronism with the rise of shutter pulse STP. This transfers charges so far stored in the individual pixels of CCD array 26 to the corresponding vertical transfer sections. The frequency of vertical transfer pulse φV (185) following field shift pulse 182 is set to several scores greater than the normal state, for example, 1 MHz. This causes unnecessary charges to be drained away within time t1 at a high speed. Since each vertical transfer section 62 has 250 stages, the time t1 needed for charge draining is 250 μsec. Draining of unnecessary charges means that the charges read from the horizontal transfer section are not used. As described above, field shift pulse 183 is produced in synchronism with the fall of shutter pulse STP. The unnecessary charges stored in the individual pixels during a time interval between field shift pulses 182 and 183 are drained away immediately before the generation of field shift pulse 184. The flow-out of the unnecessary charges can easily be executed by switching vertical transfer pulse φV from 15.75 KHz to 1 MHz at a given timing.

An explanation of a strobo photographing will now be given.

Shutter controller 24 produces a strobo trigger pulse 187 immediately after the fall of shutter pulse STP as shown in FIG. 18. In response to the strobe trigger pulse, an electronic flash (strobo) mounted on the hot shoe of the camera irradiates an intense flash of light. The flash light causes light to leak into vertical transfer sections 62 of CCD array 26. Consequently, the unnecessary charges are generated in vertical transfer sections 62. The unnecessary charges can be removed by executing the charge flow-out by vertical transfer pulse 186. According to the camera of this invention, when the flashing time is 50 μsec, strobo synchronized photographing is possible with the shutter speed of up to about 1/3000 sec.

The configuration of shutter controller 24 will now be described with reference to FIG. 19.

As shown in FIG. 18, when release 11 is half depressed, a high level control signal S1 is output until the depression of release 11 is released. This control signal S1 is applied to an $\overline{\text{INHIBIT}}$ terminal of a flip-flop 191 of FIG. 19 to release the inhibiting state of flip-flop 191. When release 11 is fully depressed, a high level control signal S2 is output and supplied to a set terminal S of flip-flop 191, thus setting flip-flop 191. Consequently, a control pulse F is output from a terminal Q of flip-flop 191. This control pulse F enables AND gates 192 and 194. Vertical sync signal V2 is applied to a clock terminal of a ternary counter 193 through AND gate 192.

Vertical sync signal V2 is latched by a latch circuit 198 through AND gate 194 that is enabled by control signal F. As a result, latch circuit 198 generates a high level shutter pulse STP. It will be evident that the rise of shutter pulse STP synchronizes with the first vertical sync pulse immediately after full depression of the release. This first vertical sync signal clears a counter 195 that counts horizontal sync signal H2. Digital data relating to the shutter speed set by the shutter speed dial is latched by a latch circuit 196, which is coupled to a comparator 197. To comparator 197 is coupled a count output of counter 195 which counts horizontal sync signal H. Upon detecting a coincidence between the contents of latch circuit 196 and counter 155, comparator 197 clears latch circuit 198. As a result, shutter pulse STP goes low. It will be understood that the pulse width of shutter pulse STP is an integer multiple of the interval between horizontal sync signals.

Ternary counter 193 has outputs Q1, Q2 and Q3 and the last output Q3 is coupled to a reset input R of flip-flop 191. Therefore, as shown in FIG. 20, flip-flop 191 is reset by the fourth vertical sync signal produced after generation of control signal F, i.e., after full depression of the release. Output Q2 of counter 193 may be used as frequency-division factor switching pulse SWP and write pulse WP.

As shown in FIG. 17, a test switch 179 may be provided to supply the frequency-division factor switching signal to frequency divider 172 through gate 176, as needed. Accordingly, the operation timings of the A/D converter and the memory can be adjusted by switching the frequency of the clock pulse during camera assembling or during camera adjustment.

In the aforementioned embodiment so far described, an image to be displayed on the finder is a motion picture irrespective of the shutter speed. Photographing can be performed while confirming the shutter speed and the aperture through the finder. The timing chart for this embodiment will now be explained with reference to FIG. 21. This embodiment differs from the foregoing embodiment in that shutter pulse STP is generated even in the motion image mode. That is, shutter controller 24 generates shutter pulse STP in response to a release signal S1. At the same time, signal generator 173 generates field shift pulse FSP in response to the fall of shutter pulse STP and a high-speed charge-drain pulse so as to display an image corresponding to the shutter speed on the finder.

Figure 21:
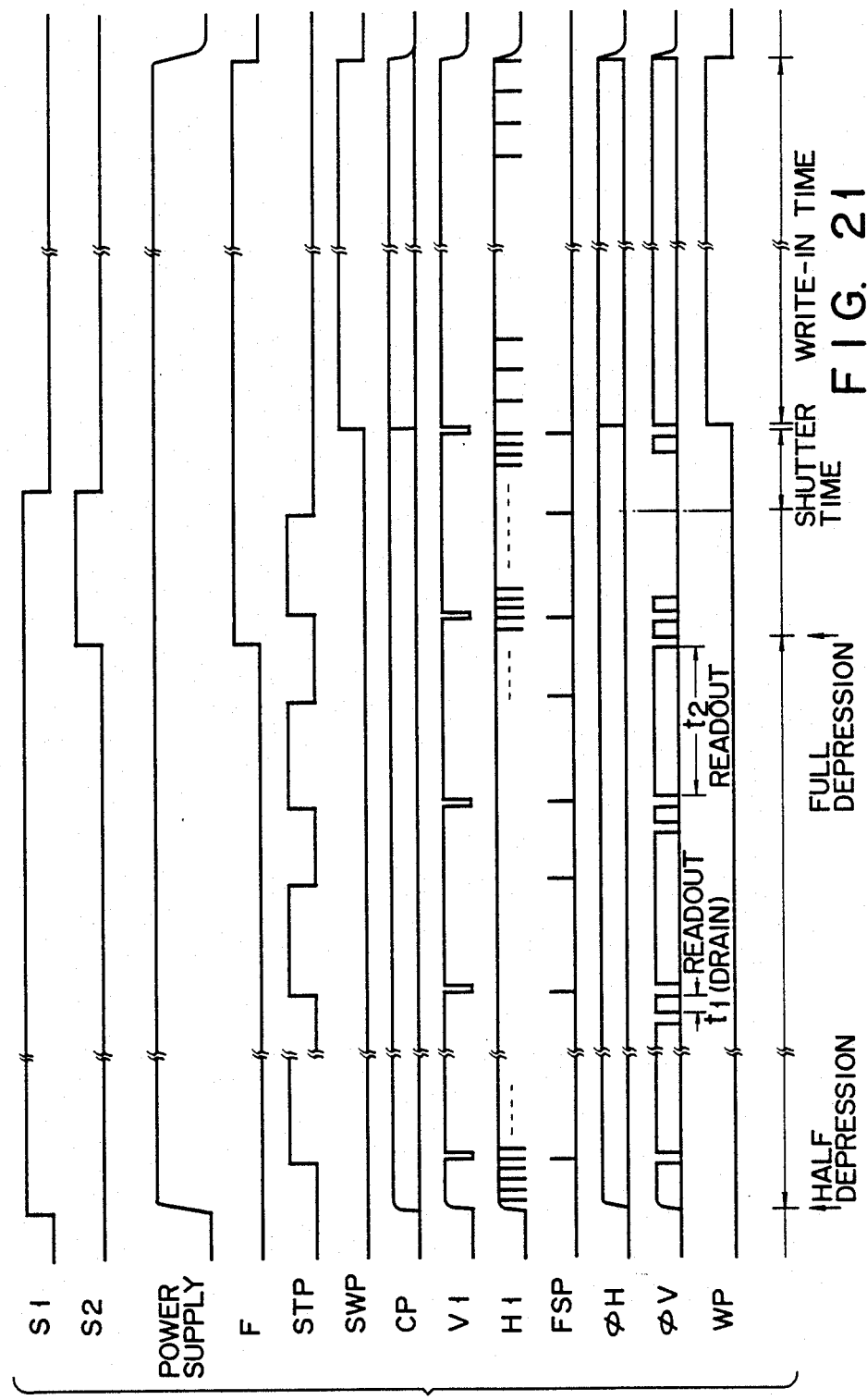
FIG. 21 is a diagram of a timing chart for explaining another operation of the electronic camera of this invention.

As is evident from the timing chart of FIG. 21, the unnecessary charges stored during the period of shutter pulse STP (corresponding to the shutter speed) are drained away by high speed vertical transfer pulse $\phi V$ immediately before the next shutter pulse, the charges stored between the fall of the shutter pulse and the rise of the next shutter pulse are read out, and R, G and B signals based on the read charges are supplied to the finder. This causes an image corresponding to the shutter speed to be displayed in the motion image mode. In this embodiment, the same operation as is performed in the foregoing embodiment is performed after full depression of the release.

The so far described embodiments use an interline transfer type solid state imaging elements shown in FIG. 6. The present standard television system employs an interlace system, so that a frame image is displayed in 1/30 sec. This means that the number of the vertical transfer sections may be half the pixels (500) of each column i.e., 250. With the use of the aforementioned solid state imaging device, therefore, a one-field still picture, having half the vertical resolution, is obtained. A one-frame picture can be formed by a solid state imaging device having the same number of the vertical transfer section's stages as the number of pixels in each column.

A camera using a frame interline type CCD array to form a one-frame picture will now be explained.

FIG. 22 shows an example of a frame interline type CCD. According to the imaging element of this type, pixels 221 formed of photoelectric conversion elements such as photodiodes are two-dimensionally arrayed. Vertical transfer sections 222 each of 250 stages one provided adjacent to the individual columns of pixels. The charges of pixels are transferred to the associated vertical transfer sections 222 by a field shift pulse and transferred to corresponding charge storage sections (frame memories) 224 through a transfer gate 223. The signal charges of charge storage sections 224 are extracted from an output circuit 226 via a horizontal transfer section 225 as electric signals. An overflow drain 227 is provided on the other side of the vertical transfer sections.

This CCD array consists of pixels of 800 columns × 500 rows, and each charge storage section 224 has a capacity to store the charges of all the pixels in the associated column.

Figure 23:
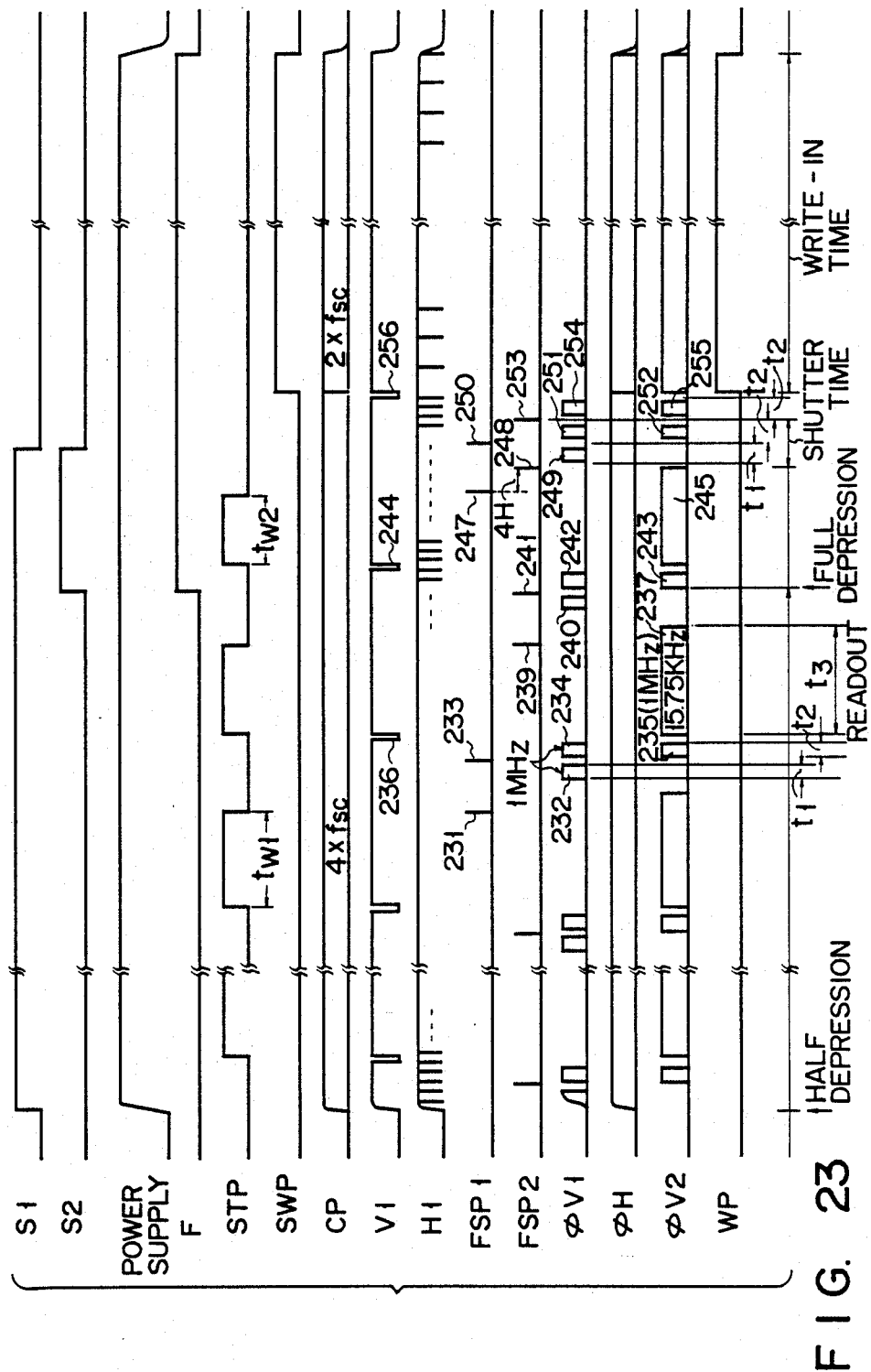
FIG. 23 is a diagram of a timing chart for explaining an operation of an electronic camera utilizing the solid state imaging device of FIG. 22.

The operation of the camera using the imaging device will now be explained, referring to the timing chart of FIG. 23.

When release 11 is half depressed to output release signal S1, the power circuit is energized and driver 25 generates various pulses to drive CCD array 26. The frequency of the clock supplied to signal generator 173 at this time is 4×fsc, and the frequencies of the vertical and horizontal sync signals are therefore 60 Hz and 15.75 KHz, respectively.

According to this embodiment, also, shutter pulse STP is generated in synchronism with a vertical sync signal in the motion image mode, and falls after a time period corresponding to the shutter speed. A field shift pulse is generated in synchronism with the fall of shutter pulse STP. In this embodiment, two field shift pulses FSP1 and FSP2 are generated as illustrated: FSP1 for reading out the charges of pixels of odd-numbered rows into the vertical transfer sections and FSP2 for reading the charges of pixels of even-numbered rows into the vertical transfer sections.

In synchronism with the fall of shutter pulse STP, field shift pulse FSP1 (231) is generated so that the charges of pixels of odd-numbered rows are transferred to the vertical transfer sections. After a predetermined time period, vertical transfer pulse $\phi V1$ (232) is generated to cause the charges of the vertical transfer sections to flow out into overflow drain 227. Given that the frequency of vertical transfer pulse $\phi V1$ is about 1 MHz, 64 times the frequency of the horizontal sync signal, the time t1 for the charge drain is about 250 $\mu$sec (the number of the vertical transfer sections is 250). Field shift pulse FSP1 (233) is generated again after the charge drain to transfer the charges of pixels of odd-numbered rows to the vertical transfer sections. Immediately thereafter, vertical transfer pulse $\phi V1$ (234) and vertical transfer pulse $\phi V2$ (235) are generated to transfer the charges of pixels of the odd-numbered rows to frame memories 224 through vertical transfer sections 222. If the frequencies of vertical transfer pulse $\phi V1$ and vertical transfer pulse φV2 are about 1 MHz, the transfer time t2 is about 250 μsec.

Vertical transfer pulse φV2 (237) of 15.75 KHz is generated in synchronism with the next vertical sync pulse (236), so that the charges of pixels of the odd-numbered rows are transferred to horizontal transfer section 225 from frame memories 224 and are read out from the horizontal transfer section in synchronism with horizontal transfer pulse φH. This reading time is t3. Shutter pulse STP (238) rises again at the same time the readout of the charges from pixels of the odd-numbered rows begins, and falls gain after a predetermined time period. In synchronism with the fall of the shutter pulse, field shift pulse FSP2 (239) is generated so that the charges of pixels of even-numbered rows are read out into the vertical transfer sections. After a predetermine time, the vertical transfer sections are driven by vertical transfer pulse φV1 (240) of about 1 MHz, causing these charges of pixels of even-numbered rows to flow out into overflow drain 227. After the charge flow-out, field shift pulse FSP2 (241) is generated again so that the charges are read out from the pixels of the even-numbered rows into the vertical transfer sections. These charges are then transferred to frame memories 224 by vertical transfer pulse φV1 (242) and vertical transfer pulse φV2 (243) like the charges of the odd-numbered rows. Frame memory transfer pulse φV2 (245) of 15.75 KHz is generated in synchronism with the next vertical sync signal (244) to read the charges of the even-numbered rows from the frame memories. In this manner, picture data for an odd-numbered field and an even-numbered field are alternately read out from the horizontal transfer section in the motion image mode. The finder displays a motion image of one frame.

When release 11 is fully depressed after checking the view angle, shutter speed and focusing, release signal S2 is output. In synchronism with release signal S2, control pulse F is generated as in the above mentioned embodiment. Shutter pulse STP (241) is generated in synchronism with the first vertical sync signal (244) following control pulse F. The pulse width of this shutter pulse is tw2. Field shift pulse FSP1 (247) is generated in synchronism with the fall of the shutter pulse so that the charges of pixels of odd-numbered rows are transferred to the vertical transfer sections. With a delay of about 250 μsec (4H in this example: H is the interval between horizontal sync signals) after the generation of field shift pulse FSP1, field shift pulse FSP2 (248) is generated so that the charges of pixels of even-numbered rows are read out into the vertical transfer sections. After a predetermined period of time, vertical transfer pulse φV1 (249) is supplied to the vertical transfer sections and the charges that have already been read out from the pixels of odd-numbered and even-numbered rows are transferred to overflow drain 227. Thereafter, field shift pulse FSP1 (250) is generated to transfer charges of pixels of the odd-numbered rows into the vertical transfer sections. These charges are then transferred to frame memories 224 by the subsequent generation of high speed vertical transfer pulse φV1 (251) and frame memory transfer pulse φV2 (252). Field shift pulse FSP2 (253) is generated again after about 250 μsec from the generation of field shift pulse FSP1, transferring the charges of the pixels of even-numbered rows to the vertical transfer sections. These charges are then transferred to frame memories 224 by vertical transfer pulse φV1 (254) and vertical transfer pulse φV2 (255).

The pulse width tw2 of shutter pulse STP at this time is:

$$tw2 = 16.67 \text{ msec} - (t1 + 2t2) - \text{shutter time}$$

Provided that the shutter time is 2 msec, and t1=t2=250 μsec, tw2=13.92 msec, which is about 219 times the pulse width of the horizontal sync pulse.

As mentioned earlier, frequency-division factor switching pulse SWP is generated in synchronism with vertical sync signal 256 after the charges of all the pixels are transferred to frame memories 224. As a result, the frequencies of various signals generated from signal generator 173 are reduced to a half, as is the case in the previous embodiment. Accordingly, the pixel charges stored in frame memories 224 are sequentially read out into horizontal transfer section 225 by a low speed vertical transfer pulse φV2 and then read out from the transfer section by a low-speed horizontal transfer pulse φH.

Modifications of the reproducing device for a still picture will be discussed.

For a TV monitor without R, G and B input terminals, a reproducing device shown in FIG. 24 may be used. According to this reproducing device, a picture signal read out from memory card 15 is separated into R, G and B signals in a separator 301 and is supplied to a matrix calculation circuit 302 where they are synthesized to provide Y, R-Y, B-Y signals. These Y, R-Y and B-Y signals are converted into analog signals by D/A converters 303a to 303c before they are supplied to a monitor.

In addition, as shown in FIG. 25, it is possible that the R-Y and B-Y signals are modulated with a color subcarrier in a digital NTSC circuit 304 and are then supplied with sync signals to provide a composite video signal. This composite video signal is supplied to a TV receiver.

According to the foresaid embodiment the picture data signals from CCD array 26 are recorded on the memory card in the order they are output. As shown in FIG. 26, however, the memory area may be divided into color data areas to separately store picture data signals of respective colors. This simplifies the reproducing circuit. In FIG. 26, there is a data area for storing such data as the photographing date and the shutter speed. This data area corresponds to the region on the memory card in FIG. 14 where no picture data is recorded.

What is claimed is:

1. An electronic still camera comprising:
   a camera housing;
   an optical system disposed in said camera housing;
   a solid state imaging device, which is disposed at a predetermined location in said camera housing and on which an image of an object is focused through said optical system, said solid state imaging device including a number of pixels for storing signal charges corresponding to the amount of incident light thereto, and readout means for reading out a signal charge stored in each of said pixels as an analog picture signal;
   shutter release means having a shutter release disposed on said camera housing and adapted to be actuated by an operator, said shutter release serving as a mode change-over switch which provides a first control signal by half depression of said shutter release and a second control signal by full depression of said shutter release;

shutter control circuit means, coupled to said shutter release means, for generating in response to the second control signal a shutter pulse having a pulse width corresponding to a shutter time set externally, and a solid state imaging device drive frequency switching control signal;

solid state imaging device driving means for driving said solid state imaging device on a real time basis in response to the first control signal to continuously derive analog picture signals representing a motion image of the object, controlling a charge storage time of said solid state imaging device according to the pulse width of the shutter pulse in response to reception of the shutter pulse and deriving, from said solid state imaging device, an analog picture signal corresponding to the signal charge stored in each of said pixels within the charge storage time at a low speed in response to the solid state imaging device drive frequency switching control signal;

electronic view finder means, coupled to said solid state imaging device, for displaying the motion image of the object based on the analog picture signal continuously derived from said solid state imaging device when said solid state imaging device is driven on a real time basis;

analog-to-digital conversion means, coupled to said solid state imaging device and said solid state imaging device driving means, for converting the analog picture signal derived from said solid state imaging device for each of said pixels, into a digital picture signal at a low speed; and a card type recording medium, adapted to be loaded into a predetermined location of said camera housing through an insert section provided thereon, said recording medium having a plurality of semiconductor memory chips for recording the digital picture signal from said analog-to-digital conversion means for each of said pixels in response to said solid state imaging device driving means.

2. The camera according to claim 1, wherein said camera further includes a built-in battery; and said card type recording medium includes a backup battery for retaining digital data stored in said semiconductor memory chips, and power-supply switching means for coupling said backup battery to said semiconductor memory chips when said recording medium is not loaded into said camera housing and for coupling said built-in battery of said camera housing to said semiconductor memory chips when said recording medium is loaded in a predetermined location of said camera housing.

3. The camera according to claim 1, wherein said solid state imaging device driving means includes:
an oscillator for generating a clock signal with a predetermined frequency;
signal generator means, coupled to said oscillator, for generating solid state imaging device drive signals each having a frequency corresponding to the predetermined frequency of the clock signal; and
a programmable frequency-divider, coupled between said oscillator and said signal generator means, for changing a frequency-dividing factor for said clock signal supplied to said signal generator means from a first frequency-dividing factor to a second frequency-dividing factor larger than the first frequency-dividing factor, in response to the solid state imaging device drive frequency switching control signal, so that said solid state imaging device is driven on a real time basis from the generation of the first control signal until the generation of the solid state imaging device drive frequency switching control signal, and is driven at a speed, which is lower than the speed in the realtime basis driving of said solid state imaging device, after the generation of the imaging device drive frequency switching control signal.

4. The camera according to claim 1, wherein said solid state imaging device driving means generates drive signals including vertical and horizontal sync signals of frequencies in a television system to drive said solid state imaging device on a real time basis, in response to the first control signal, and is responsive to the shutter pulse to set the charge storage time of said solid state imaging device to be less than one cycle period of the vertical sync signal according to a pulse width of the shutter pulse.

5. The camera according to claim 4, wherein the shutter pulse is generated in synchronism with a first vertical sync signal, and the charge storage time of said solid imaging device is defined by a time between the end of the shutter pulse and a second vertical sync signal following the first vertical sync signal.

6. The camera according to claim 1, wherein said solid state imaging device driving means generates drive signals including vertical and horizontal sync signals of frequencies defined by a television system to drive said solid state imaging device on a real time basis, said shutter control means generates the shutter pulse in synchronism with a first vertical sync signal, and said solid state imaging device driving means drains away unnecessary charges stored in said solid state imaging device at a high speed immediately after the first vertical sync signal and immediately before a second vertical sync signal following the first vertical sync signal and extracts, at a low speed, charges stored during the charge storage time between the end of the shutter pulse and the second vertical sync signal, after the second vertical sync signal.

7. The camera according to claim 1, wherein said shutter control circuit means generates a strobe control signal to emit a flash of light through a flash unit after the shutter pulse, and said solid state imaging device driving means drains away unnecessary charges stored in said solid state imaging device to flow out after the termination of the emission of the flash of light, and derives signal charges stored within said charge storage time.

8. In an electronic still camera comprising a shutter release, a solid state imaging device on which an image of an object is focused through an optical system, a driver for driving said solid state imaging device to extract a picture signal representing the image of the object, a recording medium for receiving the picture signal from said solid state imaging device and recording a still picture of the object, and an electronic monitor for receiving the picture signal from said solid imaging device to display a motion image of the object, a method for operating said electronic still camera in a motion image display mode and a still image recording mode, comprising the steps of:
generating a first control signal by half depression of said shutter release;
causing said driver to generate drive signals including vertical and horizontal sync pulses defined by a standard television system in response to the first control signal, so as to drive said solid state imaging device on a real time basis;

supplying a picture signal extracted from said solid state imaging device driven on a real time basis, to said electronic monitor to display a motion image of the object;

generating a second control signal by full depression of said shutter release;

generating a shutter pulse in response to the second control signal in synchronism with a first vertical sync pulse after the generation of the second control signal, the shutter pulse having a pulse width corresponding to a shutter time externally set;

storing, in said solid state imaging device, a picture signal representing a still picture of said object within a time from the end of the shutter pulse and a second vertical sync signal following the first vertical sync signal;

reducing the frequencies of said drive signal generated by said driver, in response to the second vertical sync pulse, thereby driving said solid state imaging device at a speed lower than that attained in the motion image display mode; and recording on said recording medium, a picture signal representing a still picture of the object read from said solid state imaging device at a low speed.

9. The method according to claim 8, further comprising the steps of:

draining away charges stored in said solid state imaging device immediately after generation of the shutter pulse; and draining away charges stored in said solid state imaging device immediately before the second vertical sync pulse.

* * * * *